US012773770B2

(12) United States Patent
Koenig et al.

(10) Patent No.: US 12,773,770 B2
(45) Date of Patent: Oct. 27, 2026

(54) ELECTRONIC CLUTCH FOR POWER TOOL

(71) Applicant: BLACK & DECKER INC., New Britain, CT (US)

(72) Inventors: Trevor J. Koenig, Towson, MD (US); Joseph P. Kelleher, Parkville, MD (US); Rick J. Heavel, Hanover, PA (US); Heather Schafer, Towson, MD (US); Thomas Delmont, Clarksville, MD (US)

(73) Assignee: Black & Decker Inc., New Britain, CT (US)

(*) Notice: Subject to any disclaimer, the term of this patent is extended or adjusted under 35 U.S.C. 154(b) by 613 days.

(21) Appl. No.: 18/099,532

(22) Filed: Jan. 20, 2023

(65) Prior Publication Data

US 2023/0278185 A1 Sep. 7, 2023

Related U.S. Application Data

(60) Provisional application No. 63/304,358, filed on Jan. 28, 2022.

(51) Int. Cl.
*B25F 5/00* (2006.01)

(52) U.S. Cl.
CPC .................................. *B25F 5/001* (2013.01)

(58) Field of Classification Search
CPC .............................. B25B 23/147; B25F 5/001
USPC ........................................................ 173/178
See application file for complete search history.

(56) References Cited

U.S. PATENT DOCUMENTS

| | | | |
|---|---|---|---|
| 1,574,521 | A | 2/1926 | Stern et al. |
| 1,602,497 | A | 10/1926 | Livingston |
| 3,330,930 | A | 7/1967 | Hill et al. |
| 3,435,168 | A | 3/1969 | Cooney |

(Continued)

FOREIGN PATENT DOCUMENTS

| | | | |
|---|---|---|---|
| DE | 3716205 | C2 | 2/1993 |
| EP | 3238880 | A1 | 11/2017 |

OTHER PUBLICATIONS

Extended European Search Report, EP Application No. 23153101.3, Jun. 1, 2023, 10 pages, EPO.

*Primary Examiner* — Veronica Martin
*Assistant Examiner* — Mary C Hibbert-Copeland
(74) *Attorney, Agent, or Firm* — Brake Hughes Bellermann LLP

(57) ABSTRACT

A power tool includes a housing; an electric motor; an electronic clutch; and a clutch setting assembly that includes a variable resistive element, a clutch selector, and a contact assembly. The contact assembly includes a spring coupled to the clutch selector and a contact member with a leg configured to be insertable into an opening in the clutch selector so that the spring and the contact member are non-removable from the clutch selector and the spring biases the contact member against the variable resistive element. The contact member has a head configured to engage the variable resistive element to generate a resistance signal that corresponds to a position of the clutch selector. The controller is configured to receive the resistance signal and, based on the resistance signal, look-up, receive, or generate the torque threshold value for the power tool operation parameter that corresponds to the selected clutch setting.

40 Claims, 35 Drawing Sheets

(56) References Cited

U.S. PATENT DOCUMENTS

| | | | |
|---|---|---|---|
| 3,499,134 A | 3/1970 | Klosterman | |
| 4,397,519 A | 8/1983 | Cooney | |
| 5,897,454 A | 4/1999 | Cannaliato | |
| 6,267,543 B1 | 7/2001 | David et al. | |
| 7,201,613 B2 | 4/2007 | Sasaki | |
| 7,452,304 B2 | 11/2008 | Hagan et al. | |
| 9,193,055 B2 | 11/2015 | Lim et al. | |
| 9,494,200 B2 | 11/2016 | Kelleher et al. | |
| 10,220,500 B2 | 3/2019 | Lim et al. | |
| 2014/0034347 A1 | 2/2014 | Lam et al. | |
| 2016/0031072 A1* | 2/2016 | Lim | B25B 21/00 173/178 |

* cited by examiner

ELECTRONIC CLUTCH FOR POWER TOOL

CROSS-REFERENCE TO RELATED APPLICATIONS

This application claims the benefit of priority from U.S. Provisional Application No. 63/304,358, filed Jan. 28, 2022, titled "ELECTRONIC CLUTCH FOR POWER TOOL," which is incorporated herein by reference in its entirety.

FIELD

The present patent application relates to power tools and electronic clutches/mechanisms for power tools.

BACKGROUND

Many power tools, such as power drills, power drivers, power fastening tools and/or other power tools, have a mechanical clutch that interrupts power transmission to the output spindle/shaft when the output torque exceeds a threshold value of a maximum torque. U.S. Pat. No. 9,494, 200, which is incorporated by reference in the patent application in its entirety, provides an exemplary prior art mechanical clutch. Such a mechanical clutch is a purely mechanical device that breaks a mechanical connection in the transmission to prevent torque from being transmitted from the motor to the output spindle/shaft of the power tool. Clutches or slip clutches are generally used in the power tools to provide torque limited application at the working bit. Traditional slip clutches have been executed mechanically with balls, springs, and clutch plates. In these mechanical clutches, the maximum torque threshold value may be user adjustable, often by a clutch collar that is attached to the power tool between the power tool and the tool holder/ chuck. The user may rotate the clutch collar among a plurality of different positions for different maximum torque settings. The components of the mechanical clutches, however, tend to wear over time, and add excessive bulk and weight to a power tool.

In order to save length and cost, some power tools additionally or alternatively include an electronic clutch. Such an electronic clutch electronically senses the output torque (e.g., via a torque transducer) or infers the output torque (e.g., by sensing another parameter such as current drawn by the motor). U.S. Pat. No. 10,220,500 ("the '500 Patent"), which is incorporated by reference in the present patent application its entirety, provides an exemplary prior art electronic clutch. When the electronic clutch determines that the sensed output torque exceeds a threshold value, it interrupts or reduces power transmission to the output shaft/spindle, either mechanically (e.g., by actuating a solenoid to break a mechanical connection in the transmission) or electrically (e.g., by interrupting or reducing current delivered to the motor, and/or by actively braking the motor).

For example, the electronic clutch (e.g., like the one in the '500 Patent) includes a rotatable clutch collar for selecting the clutch setting. The controller for the electronic clutch needs to know the position of the rotatable clutch collar in order to adjust the clutch setting. As shown in FIG. 7 of the '500 Patent, the clutch setting is sensed using a sensor/ stationary membrane potentiometer. A spring 70 is heat-staked to the clutch collar and rotates along with the clutch collar. The spring 70 includes a stylus-type projection that is pressed against the stationary membrane potentiometer. Depending on the rotational position of the clutch collar and the spring 70, the stylus-type projection of the spring 70 engages a different location of the stationary membrane potentiometer. Thus, the resistance in the membrane potentiometer would change and the controller could sense the rotational position of the clutch collar. Various improvements to this design are desired.

SUMMARY

The present patent application provides improvements in the clutches for power tools.

One aspect of the present patent application provides a power tool. The power tool comprises a housing, an output spindle, an electric motor, an input switch for actuating the electric motor, an electronic clutch, and a clutch setting assembly. The electric motor is disposed in the housing and is configured to provide torque to the output spindle. The electronic clutch includes a sensor and a controller. The sensor of the electronic clutch is configured to sense a power tool operation parameter. The controller of the electronic clutch is coupled to the sensor and is configured to initiate a first protective operation to interrupt or reduce transmission of torque from the electric motor to the output spindle when the sensed power tool operation parameter exceeds a torque threshold value. The clutch setting assembly includes a variable resistive element, a clutch selector, and a contact assembly. The variable resistive element has a variable resistance and is coupled to the housing. The clutch selector is movable relative to the housing to select a clutch setting. The contact assembly includes a contact member and a spring non-removably coupled to the clutch selector with the spring biasing the contact member against the variable resistive element. The contact member has a head configured to engage the variable resistive element to generate a resistance signal that corresponds to a position of the clutch selector. The controller is configured to receive the resistance signal and, based on the resistance signal, is configured to look-up, receive, or generate the torque threshold value for the power tool operation parameter that corresponds to the selected clutch setting. In one embodiment, the head may include an asymmetrical shaped configuration. In one embodiment, the contact member may be a contact pin. In one embodiment, the head may include a projection disposed thereon, and the projection may be configured to engage the variable resistive element to generate the resistance signal that corresponds to the position of the clutch selector.

Another aspect of the present patent application provides a power tool. The power tool comprises a housing; an output spindle; an electric motor disposed in the housing and configured to provide torque to the output spindle; an input switch for actuating the electric motor; an electronic clutch; and a clutch setting assembly. The electronic clutch includes a sensor configured to sense a power tool operation parameter and a controller that is coupled to the sensor and is configured to initiate a first protective operation to interrupt or reduce transmission of torque from the electric motor to the output spindle when the sensed power tool operation parameter indicates that an output torque has exceeded a torque threshold value. The clutch setting assembly includes a variable resistive element with a variable resistance coupled to the housing, a clutch selector movable relative to the housing to select a clutch setting, and a contact assembly coupled to the clutch selector. The contact assembly includes a spring coupled to the clutch selector and a contact member with a shaft configured to be insertable into an opening in the clutch selector so that the spring and the contact member are non-removable from the clutch selector and the spring biases the contact member against the variable resistive element. The contact member has a head configured to engage the variable resistive element to generate a resistance signal that corresponds to a position of the clutch selector. The controller may be configured to receive the resistance signal and, based on the resistance signal, look-up, receive, or generate the torque threshold value for the power tool operation parameter that corresponds to the selected clutch setting.

Implementations of the foregoing aspects may include one or more of the following features. The head may include a projection disposed thereon. The projection may be configured to engage the variable resistive element to generate the resistance signal that corresponds to the position of the clutch selector.

The variable resistive element may be non-movable relative to the housing.

The clutch selector may comprise a collar rotatably coupled to the housing and rotation of the collar changes the selected clutch setting.

The spring may be received within an opening in the clutch selector and a leg of a spring keeper may be received within the spring.

The power tool may comprise a second spring that may be received in a second opening in the clutch selector.

The clutch selector may include a spring keeper coupled to the spring and the contact member coupled to the spring keeper. The contact member may be moveable relative to the spring keeper to non-removably retain the spring, the spring keeper, and contact member relative to the clutch selector.

The spring keeper may comprise a leg and the contact member includes the shaft and the head.

The shaft of the contact member may include a key and the clutch selector includes a slot, whereby rotation of the contact member causes the key to engage the slot to retain the contact member in the clutch selector.

The shaft of the contact member may be configured to be snap fit into the opening of the clutch selector.

The shaft of the contact member may include a catch configured to engage an undercut in the opening of the clutch selector.

The opening of the clutch selector may comprise a plurality of openings and a leg of a spring keeper comprises a plurality of legs received in the plurality of openings The sensor may include a rotation sensor that is configured to sense changes in an angular position of an output shaft of the motor and to provide a sensing signal corresponding to angular rotation, speed, and/or acceleration of the motor to the controller.

The first protective operation may include at least one of interrupting power to the motor, reducing power to the motor, braking the motor, and actuating a mechanical clutch element.

The variable resistive element may include a plurality of conductive elements circumferentially spaced apart on the variable resistive element. The resistance of the variable resistive element may change when pressure is applied by the portion of the contact assembly on one of the plurality of conductive elements disposed along the variable resistive element.

Another aspect of the present patent application provides a system. The system comprises a housing, an electronic clutch, and a clutch setting assembly. The electronic clutch includes a sensor configured to sense an operation parameter of the system and a controller. The controller is coupled to the sensor and is configured to initiate a first protective operation to interrupt or reduce transmission of torque from an electric motor to an output spindle when the sensed operation parameter exceeds a torque threshold value. The clutch setting assembly includes a variable resistive element with a variable resistance coupled to the housing, a clutch selector movable relative to the housing to select a clutch setting, and a contact assembly including a contact member and a spring non-removably coupled to the clutch selector with the spring biasing the contact member against the variable resistive element. The contact member has a head configured to engage the variable resistive element to generate a resistance signal that corresponds to a position of the clutch selector. The controller is configured to receive the resistance signal and, based on the resistance signal, look-up, receive, or generate the torque threshold value for the operation parameter that corresponds to the selected clutch setting. In one embodiment, the head may include an asymmetrical shaped configuration. In one embodiment, the contact member may be a contact pin. In one embodiment, the head may include a projection disposed thereon, and the projection may be configured to engage the variable resistive element to generate the resistance signal that corresponds to the position of the clutch selector.

Another aspect of the present patent application provides a power tool. The power tool comprises a housing; an output spindle; an electric motor disposed in the housing and configured to provide torque to the output spindle; an input switch for actuating the electric motor; an electronic clutch; and a clutch setting assembly. The electronic clutch includes a sensor configured to sense a power tool operation parameter and a controller coupled to the sensor and configured to initiate a first protective operation to interrupt or reduce transmission of torque from the electric motor to the output spindle when the sensed power tool operation parameter indicates that an output torque has exceeded a torque threshold value. The clutch setting assembly includes a variable resistive element with a variable resistance coupled to the housing, a clutch selector movable relative to the housing to select a clutch setting, and a contact assembly coupled to the clutch selector. The contact assembly includes a spring coupled to the clutch selector and a contact member configured to be snap-fit with the clutch selector, so that the contact member is non-reversibly non-removable from the clutch selector and the spring biases the contact member against the variable resistive element. The contact member has a head configured to engage the variable resistive element to generate a resistance signal that corresponds to a position of the clutch selector. The controller is configured to receive the resistance signal and, based on the resistance signal, look-up, receive, or generate the torque threshold value for the power tool operation parameter that corresponds to the selected clutch setting.

Implementations of the foregoing aspects may include one or more of the following features. The contact member may include a shaft received in an opening in the clutch selector and a catch coupled to the shaft configured to engage an undercut in the opening.

Another aspect of the present patent application provides a system. The system comprises a housing and clutch setting assembly. The clutch setting assembly includes a variable resistive element with a variable resistance coupled to the housing, a clutch selector movable relative to the housing to select a clutch setting, and a contact assembly including a contact member and a spring non-removably coupled to the clutch selector with the spring biasing the contact member against the variable resistive element. The contact member has a head configured to engage the variable resistive element to generate a resistance signal that corresponds to a position of the clutch selector. The controller is configured to receive the resistance signal and, based on the resistance signal, look-up, receive, or generate a torque threshold value for an operation parameter of the system that corresponds to the selected clutch setting. In one embodiment, the head may include an asymmetrical shaped configuration. In one embodiment, the contact member may be a contact pin. In one embodiment, the head may include a projection disposed thereon, and the projection may be configured to engage the variable resistive element to generate the resistance signal that corresponds to the position of the clutch selector.

Another aspect of the present patent application provides a power tool. The power tool comprises a housing; an output spindle; an electric motor disposed in the housing and configured to provide torque to the output spindle; an input switch for actuating the electric motor; an electronic clutch; and a clutch setting assembly. The electronic clutch includes a sensor configured to sense a power tool operation parameter and a controller coupled to the sensor and configured to initiate a first protective operation to interrupt or reduce transmission of torque from the electric motor to the output spindle when the sensed power tool operation parameter indicates that an output torque has exceeded a torque threshold value. The clutch setting assembly includes a variable resistive element with a variable resistance coupled to the housing, a clutch selector movable relative to the housing to select a clutch setting, and a contact assembly coupled to the clutch selector, the contact assembly including a spring coupled to the clutch selector and a contact pin configured to be inserted into an opening in the clutch selector and then moved relative to the opening so that the contact pin is non-removable from the clutch selector and the spring biases the contact pin against the variable resistive element. The contact pin has a head configured to engage the variable resistive element to generate a resistance signal that corresponds to a position of the clutch selector. The controller is configured to receive the resistance signal and, based on the resistance signal, look-up, receive, or generate the torque threshold value for the power tool operation parameter that corresponds to the selected clutch setting.

Implementations of the foregoing aspects may include one or more of the following features. The contact pin may comprise a shaft including a key and the clutch selector may include a slot, whereby rotation of the contact pin causes the key to engage the slot to non-removably couple the contact pin to the clutch selector.

The clutch selector may include a spring keeper coupled to the spring. The contact pin may be moveable relative to the spring keeper to non-removably retain the spring, the spring keeper, and contact pin relative to the clutch selector.

Yet another aspect of the present patent application provides a power tool. The power tool comprises a housing, an output spindle, an electric motor, an input switch for actuating the electric motor, an electronic clutch, and a clutch setting assembly. The electric motor is disposed in the housing and is configured to provide torque to the output spindle. The electronic clutch includes a sensor configured to sense a power tool operation parameter and a controller. The controller is coupled to the sensor and is configured to initiate a first protective operation to interrupt or reduce transmission of torque from the electric motor to the output spindle when the sensed power tool operation parameter exceeds a torque threshold value. The clutch setting assembly includes a variable resistive element with a variable resistance coupled to the housing, a clutch selector movable relative to the housing to select a clutch setting, and a contact assembly non-removably coupled to the clutch selector. A portion of the contact assembly is configured to be axially biased along a longitudinal axis of the power tool and away from the clutch selector to engage the variable resistive element to generate a resistance signal that corresponds to a position of the clutch selector. The controller is configured to receive the resistance signal and, based on the resistance signal, look-up, receive, or generate the torque threshold value for the power tool operation parameter that corresponds to the selected clutch setting.

In one embodiment, the variable resistive element includes a plurality of conductive elements circumferentially spaced apart on the variable resistive element. In one embodiment, resistance of the variable resistive element changes when pressure is applied by the portion of the contact assembly on one of the plurality of conductive elements disposed along the variable resistive element.

In one embodiment, the contact assembly is configured to rotate along with the clutch selector. In one embodiment, the contact assembly includes a contact member and a spring configured to axially bias a portion of the contact member to engage the variable resistive element to generate the resistance signal that corresponds to the position of the clutch selector. In one embodiment, the portion of the contact assembly includes the portion of the contact member. In one embodiment, the contact member may be a contact pin. In one embodiment, the contact member may include an asymmetrical shaped plate portion and a projection disposed thereon, and the projection may be configured to engage the variable resistive element to generate the resistance signal that corresponds to the position of the clutch selector.

In one embodiment, the sensor includes a current sensor that is configured to sense an amount of current being delivered to the motor and to provide a current sensing signal corresponding to the sensed current to the controller.

In one embodiment, the sensor includes a rotation sensor that is configured to sense changes in an angular position of an output shaft of the motor and to provide a sensing signal corresponding to angular rotation, speed, and/or acceleration of the motor to the controller.

In one embodiment, the first protective operation includes at least one of interrupting power to the motor, reducing power to the motor, braking the motor, and actuating a mechanical clutch element.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIG. 4 shows the clutch selector from an insertion side of a contact pin of the contact assembly and FIG. 5 shows the clutch selector from a retaining side of the contact pin of the contact assembly;

FIGS. 9 and 10 show the clutch selector before and after the springs of the contact assembly being inserted therein, respectively, where FIGS. 11 and 12 show the clutch selector before and after the spring keeper of the contact assembly being inserted therein, respectively, where FIGS. 12 and 13 show the clutch selector before and after the contact pin of the contact assembly being inserted therein, respectively, where FIG. 13 also shows the contact pin and the spring keeper of the contact assembly pressed down to be flush with the clutch selector so as to rotate the contact pin and to align a catch of the contact pin with a retaining groove of the clutch selector, FIGS. 14 and 16 show the catch of the contact pin of the contact assembly before and after being retained by the retaining groove of the clutch selector, respectively, and FIG. 15 shows the contact assembly including the contact pin and the spring keeper of the contact assembly in its released and retained position in the clutch selector;

FIG. 25 shows the clutch selector from an insertion side the contact assembly and FIG. 26 shows the clutch selector from a retaining side of the contact assembly;

FIGS. 29 and 30 show the clutch selector before and after the springs of the contact assembly being inserted therein, respectively, where FIGS. 31 and 32 show the clutch selector before and after the spring keeper of the contact assembly being inserted therein, respectively, and FIG. 32 shows the contact assembly including the spring keeper of the contact assembly in its released and retained position in the clutch selector;

DETAILED DESCRIPTION

Figure 1A:
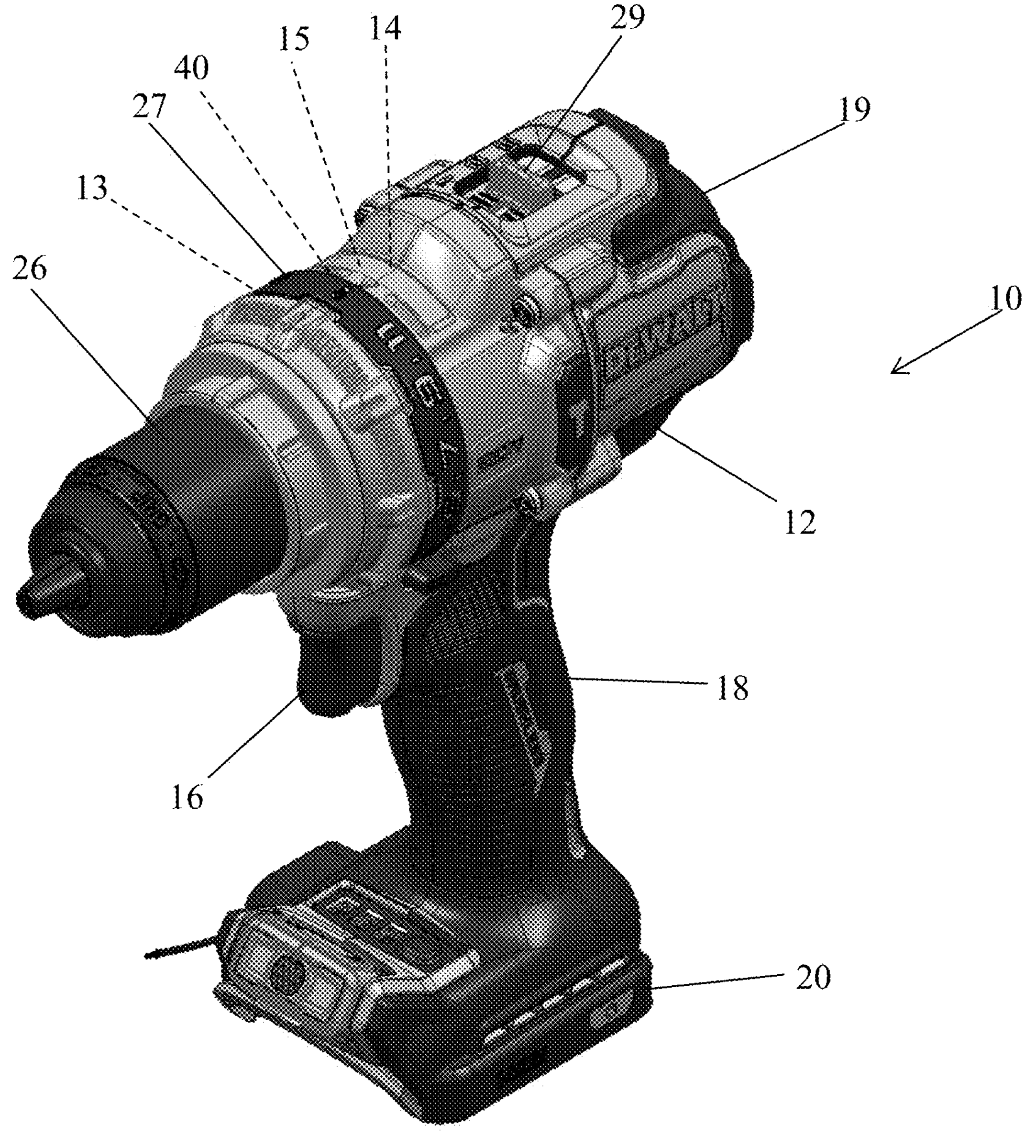
FIG. 1A shows a system/power tool having an electronic clutch and a clutch setting assembly, where the clutch setting assembly includes a clutch selector, according to an embodiment of the present patent application.
Figure 1B:
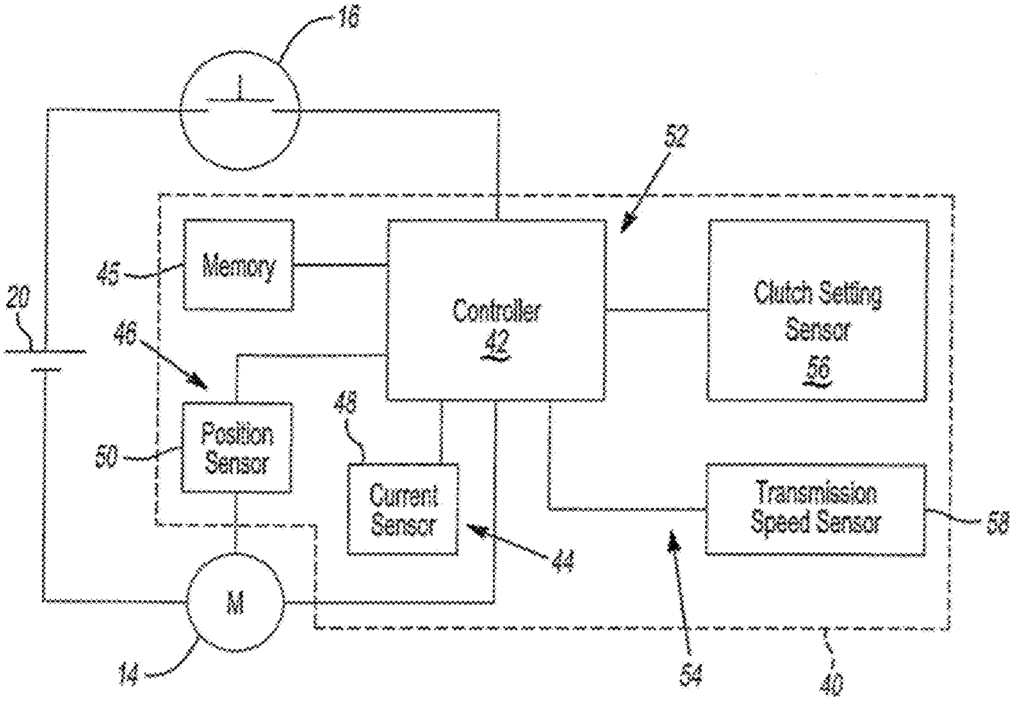
FIG. 1B shows a schematic diagram of the electronic clutch of the system/power tool of FIG. 1A according to an embodiment of the present patent application.
Figure 2:
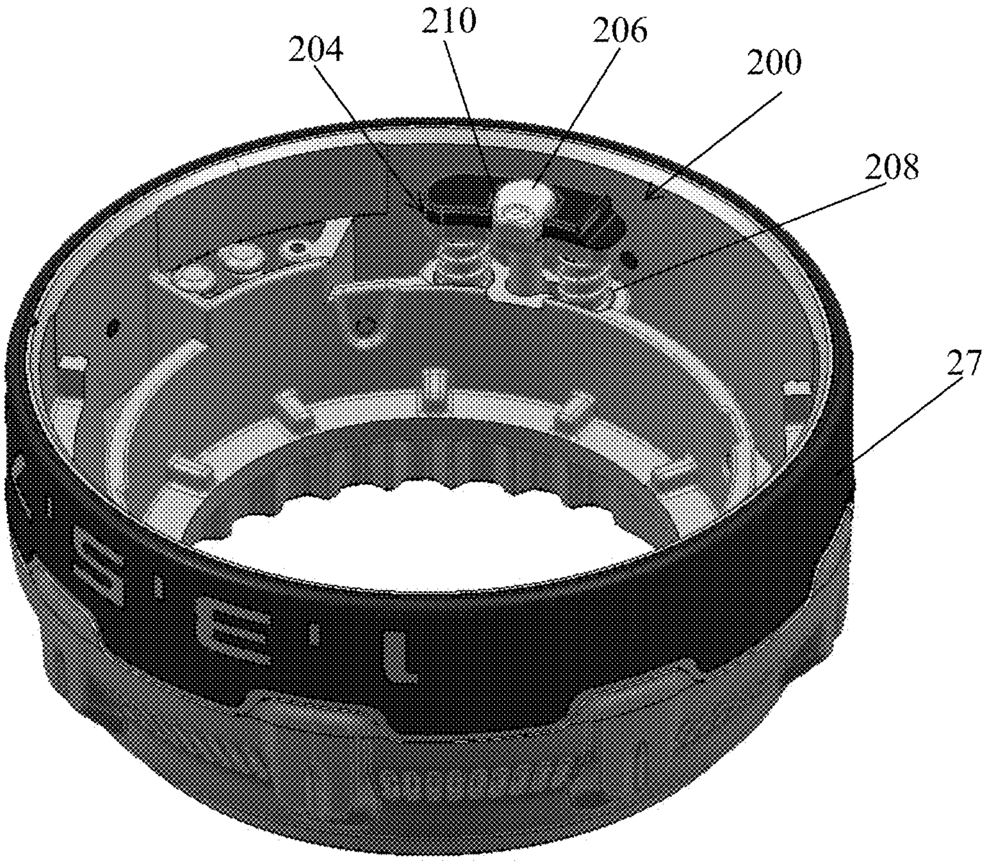
FIG. 2 shows the clutch setting assembly including the clutch selector and a contact assembly according to an embodiment of the present patent application, where some portions of the clutch setting assembly are not shown to better illustrate other portions of the clutch setting assembly.
Figure 19:
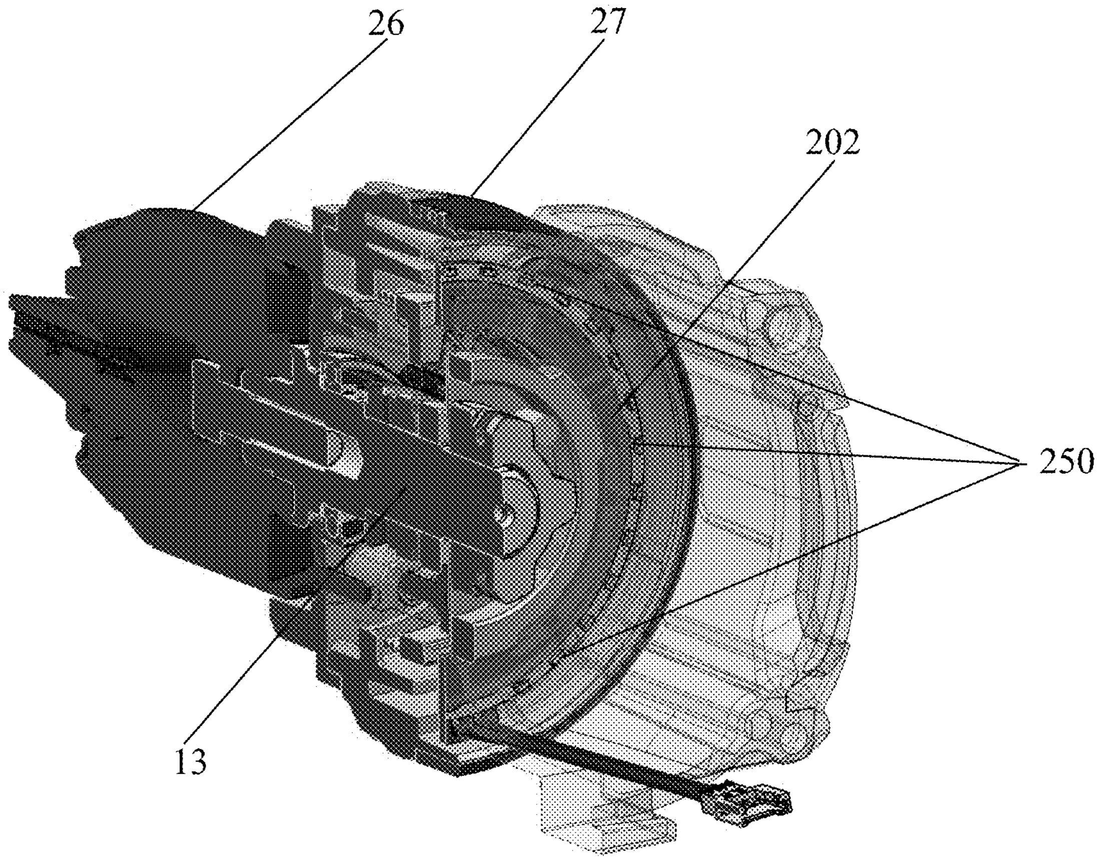

In one embodiment, referring to FIGS. 1A, 1B, 2, 17 and 19, the present patent application provides a power tool 10. The power tool 10 comprises a housing 12, an output spindle 13 (as shown in FIG. 19), an electric motor 14, an input switch 16 for actuating the electric motor 14, an electronic clutch 40, and a clutch setting assembly 200. The electric motor 14 is disposed in the housing 12 and is configured to provide torque to the output spindle 13. The electronic clutch 40 includes one or more sensors 48, 50 (as shown in FIG. 1B) and a controller 42 (as shown in FIG. 1B). The sensor(s) 48, 50 of the electronic clutch 40 is/are configured to sense one or more power tool operation parameters. The controller 42 of the electronic clutch 40 is coupled to the sensor(s) 48, 50 and is configured to initiate a first protective operation to interrupt or reduce transmission of torque from the electric motor 14 to the output spindle 13 when the sensed power tool operation parameter exceeds a torque threshold value. The clutch setting assembly 200 includes a variable resistive element 202, a clutch selector 27, and a contact assembly 204. The variable resistive element 202 has a variable resistance and is coupled to the housing 12. The contact assembly 204 is coupled to the clutch selector 27. The clutch selector 27 is movable relative to the housing 12 to select a clutch setting.

The contact assembly 204 includes a spring 208 coupled to the clutch selector 27 and a contact member 206 with a shaft 224 configured to be insertable into an opening 210 in the clutch selector 27 so that the spring 208 and the contact member 206 are non-removable from the clutch selector 27 and the spring 208 biases the contact member 206 against the variable resistive element 202. The contact member may interchangeably referred to as contact pin. The contact pin 206 has a head 226 configured to engage the variable resistive element 202 to generate a resistance signal that corresponds to a position of the clutch selector 27. The controller 42 is configured to receive the resistance signal and, based on the resistance signal, is configured to look-up, receive, or generate the torque threshold value for the power tool operation parameter that corresponds to the selected clutch setting.

In one embodiment, the contact member 206 is configured to be snap-fit with the clutch selector 27, so that the contact member 206 is non-reversibly non-removable from the clutch selector 27 and the spring 208 biases the contact member 206 against the variable resistive element 202. In one embodiment, the contact member 206 includes the shaft 224 received in the opening 210 in the clutch selector 27 and a catch 232 coupled to the shaft 224 configured to engage an undercut 222 in the opening 210.

Figure 12:
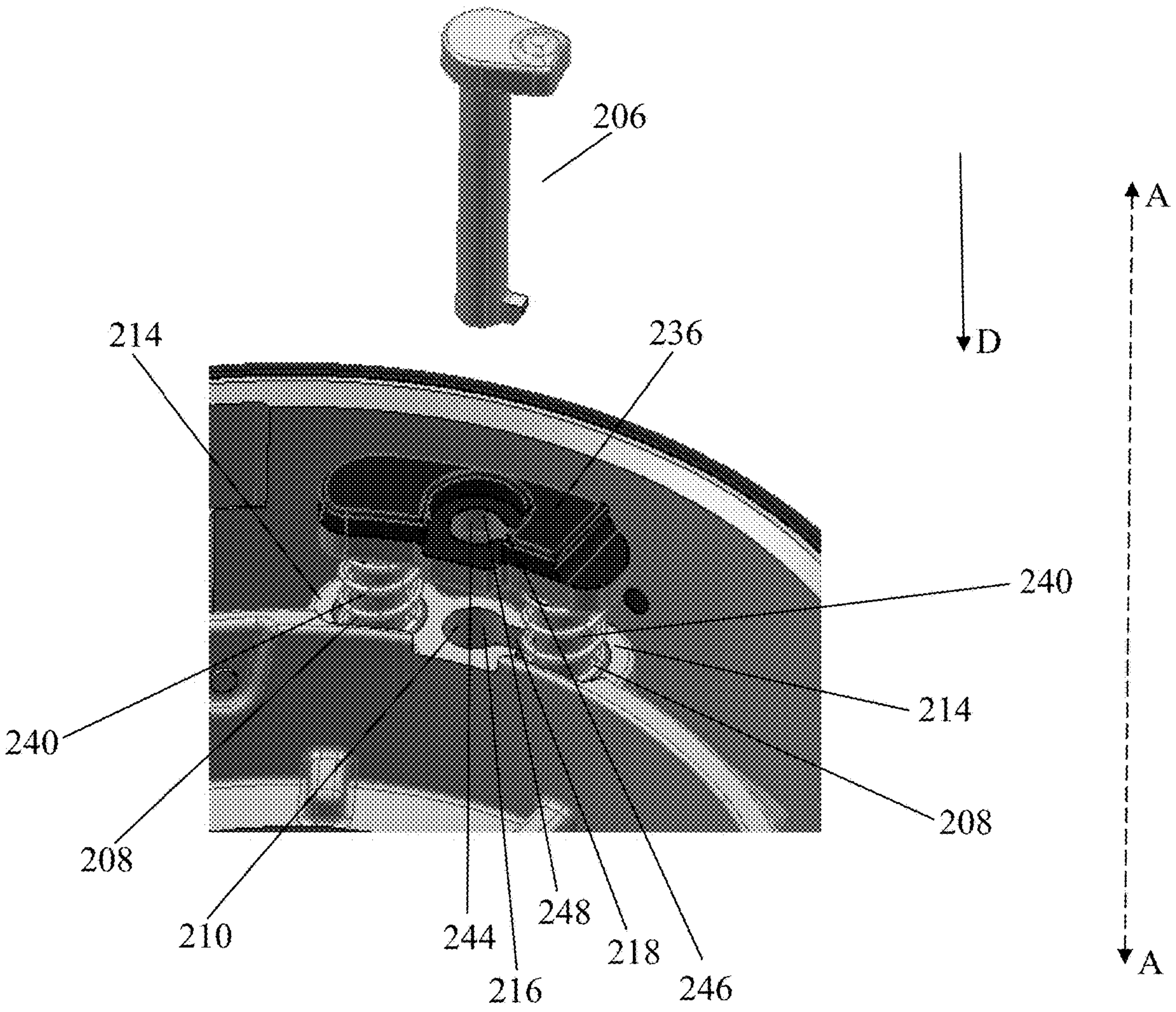

In one embodiment, a portion (e.g., a portion of the contact pin 206, a contact point 230 of the contact pin 206, or the head 226 of the contact pin 206) of the contact assembly 204 is configured to be axially biased along a longitudinal axis A-A (as shown in FIG. 12) of the power tool 10 and away from the clutch selector 27 to engage the variable resistive element 202 to generate a resistance signal that corresponds to a position of the clutch selector 27. The contact assembly 204 is configured to rotate along with the clutch selector. The contact assembly 204 includes the contact member 206 and the spring 208 configured to axially bias a portion (e.g., a portion of the contact pin 206, a contact point 230 of the contact pin 206, or the head 226 of the contact pin 206) of the contact member 206 to engage the variable resistive element 202 to generate the resistance signal that corresponds to the position of the clutch selector 27. In one embodiment, the portion of the contact assembly 204 includes the portion of the contact member 206.

FIG. 1A shows an exemplary power tool 10 constructed in accordance with the teachings of the present patent application. As those skilled in the art will appreciate, embodiments may include either a corded or cordless (battery operated) power tool/device. The power tool may be a power screwdriver, a power fastener/fastening tool, a power driver, a power drill, a power expansion tool, and/or other power tools. In illustrated embodiment of FIG. 1A, the power tool 10 is a power (cordless) drill/screwdriver. The power tool 10 may be a portable device.

In one embodiment, the power tool 10 generally includes the housing 12, the motor/motor assembly 14, a multi-speed transmission assembly 15, the electronic clutch/electronic clutch assembly 40, the output shaft/output spindle assembly 13, a tool holder/chuck 26, the input switch/trigger assembly 16 and a battery pack 20. The output spindle 13 may be interchangeably referred to as output spindle assembly, output shaft or output member. Those skilled in the art will understand that several of the components of the power tool 10, such as the tool holder 26, the trigger assembly 16 and the battery pack 20, are conventional in nature and therefore need not be discussed in significant detail in the present patent application. Reference may be made to a variety of patents/patent publications for a more complete understanding of the conventional features of the power tool 10. One example of such patents is U.S. Pat. No. 5,897,454 issued Apr. 27, 1999, which is hereby incorporated by reference in the present patent application in its entirety.

Referring to FIG. 1A, the housing 12 includes a pair of mating handle shells that cooperate to define a handle portion 18 and a drive train or body portion 19. The body portion 19 may include a motor receiving portion and a transmission receiving portion. In one embodiment, the housing 12 is configured to be coupled to an electrical power source. The electrical power source may include the battery pack 20 or an AC power source as described in detail below.

In one embodiment, the output spindle 13 is proximate a front end of the housing 12 and is coupled/connected to the tool holder 26 for holding a power tool accessory, e.g., a tool bit. The output spindle 13 is configured to rotationally drive the tool holder 26 that is configured to receive the tool bit portion therein. The power tool accessory may include a tool bit such as a drill bit, an expansion bit, a screwdriver bit and/or other tool bits. The tool holder 26 may be a keyless chuck, although it should be understood that the tool holder can have other tool holder configurations such as a quick release tool holder, a hex tool holder, or a keyed tool holder/chuck. The tool holder 26 may be interchangeably referred to as an end effector, a chuck, etc. In one embodiment, the end effector 26 is coupled to the housing 12 and is configured to perform an operation on a workpiece (not shown).

In one embodiment, the input switch/trigger assembly 16 and the battery pack 20 are mechanically coupled to the handle portion 18 and are electrically coupled to the motor assembly 14 in a conventional manner that is not specifically shown but which is readily the capabilities of one having an ordinary level of skill in the art. The power tool 10 may include other sources of power (e.g., alternating current (AC) power cord or compressed air source) coupled to a distal end of the handle portion 18.

The trigger assembly 16 may be a variable speed trigger. The trigger assembly 16 may be interchangeably referred to as an input switch. In one embodiment, the input switch 16 is configured for actuating the motor 14. The trigger assembly 16 is configured to be coupled to the housing 12 for selectively actuating and controlling the speed of the motor 14, for example, by controlling a pulse width modulation (PWM) signal delivered to the motor 14.

In one embodiment, the motor 14 is disposed in the housing 12 and is configured to provide a torque to the output spindle 13. The motor 14 may be a brushless or electronically commutated motor, although the motor 14 may be another type of brushed DC motor or universal motor.

The motor assembly 14 is housed in the motor receiving portion and includes a rotatable output motor shaft, which extends into the transmission receiving portion. In one embodiment, a motor pinion having a plurality of gear teeth is coupled for rotation with the rotatable output motor shaft. The trigger assembly 16 and battery pack 29 cooperate to selectively provide electric power to the motor assembly 14 so as to permit the user of the power tool 10 to control the speed and direction with which the rotatable output motor shaft rotates. The motor assembly 14 may interchangeably be referred to as motor 14. In one embodiment, the motor output shaft extends from the motor 14 to the transmission 15 that transmits power from the motor output shaft to the output spindle 13 and to the tool holder 26.

In one embodiment, the transmission assembly 15 comprises a multi-speed transmission having a plurality of gears and settings that allow the speed reduction through the transmission 15 to be changed, in a manner well understood to one of ordinary skill in the art. The transmission assembly 15 may comprise a multi-stage planetary gear set, with each stage having an input sun gear, a plurality of planet gears meshed with the sun gears and pinned to a rotatable planet carrier, and a ring gear meshed with and surrounding the planet gears. For each stage, if a ring gear is rotationally fixed relative to the housing 12, the planet gears orbit the sun gear when the sun gear rotates, transferring power at a reduced speed to their planet carrier, thus causing a speed reduction through that stage. If a ring gear is allowed to rotate relative to the housing 12, then the sun gear causes the planet carrier to rotate at the same speed as the sun gear, causing no speed reduction through that stage. By varying which one or ones of the stages have the ring gears are fixed against rotation, one can control the total amount of speed reduction through the transmission 15, and thus adjust the speed setting of the transmission 15 (e.g., among high, medium, and low). In one embodiment, this adjustment of the speed setting is achieved via a shift ring that surrounds the ring gears and that is shiftable along the axis of the output spindle 13 to lock different stages of the ring gears against rotation. In one embodiment, the power tool 10 includes a speed selector switch 29 for selecting the speed reduction setting of the transmission 15. In one embodiment, the speed selector switch 29 is coupled to the shift ring by spring biased pins so that axial movement of the speed selector switch 29 causes the axial movement of the shift ring. Further details regarding an exemplary multi-speed transmission is described in U.S. Pat. No. 7,452,304 which is incorporated by reference in the present patent application in its entirety. It should be understood that other types of multi-speed transmissions and other mechanisms for shifting the transmission among the speeds is within the scope of the present patent application.

In one embodiment, the power tool 10 includes the controller/control circuit 42. The controller may be interchangeably referred to as a control circuit. The controller 42 is disposed in the housing 12 and is operatively cooperable with the motor 14. As will be clear from the detailed discussions below, the controller 42 is also operatively coupled to other components of the power tool 10 (including sensors, 48, 50, 56, 58, and/or memory 45). The controller 42 is configured to receive sensed power tool operation parameters and other setting parameters from the sensors and configured to initiate a first protective operation to interrupt or reduce transmission of torque from the electric motor 14 to the output spindle 13 when the sensed power tool operation parameter exceeds a torque threshold value.

In one embodiment, the controller 42 is referred to as a microcontroller. In another embodiment, the controller 42 is referred to, be part of, or includes an electronic circuit, an Application Specific Integrated Circuit (ASIC), a processor (shared, dedicated, or group) and/or memory (shared, dedicated, or group) that execute one or more software or firmware programs, a combinational logic circuit, and/or other suitable components that provide the described functionality.

In one embodiment, the electronic clutch/electronic clutch assembly 40 is disposed in the housing 12. The electronic clutch assembly 40 is disposed in the housing 12 between the motor 14 and the end effector 26.

In one embodiment, the controller 42 for the electronic clutch 40 needs to know the position of the rotatable clutch collar 27 (i.e., configured for selecting the clutch setting) in order to adjust the clutch setting. As will be clear from the detailed discussions in the present patent application, the clutch setting/the position of the rotatable clutch collar 27 is sensed using the sensor/stationary membrane potentiometer/variable resistive element 202. The contact assembly 204 of the clutch setting assembly 200 is non-removably coupled to and rotates along with the clutch collar 27.

In one embodiment, the potentiometer contact point 230 of the contact assembly 204 is configured to be pressed against the membrane potentiometer/variable resistive element 202. Depending on the rotational position of the clutch collar 27 and the contact assembly 204 non-removably coupled to the clutch collar 27, the potentiometer contact point 230 of the contact assembly 204 engages with a different location/portion of the stationary membrane potentiometer/variable resistive element 202. Thus, the resistance in the variable resistive element 202 would change and the controller 42 for the electronic clutch 40 could sense the rotational position of the clutch collar 27.

In illustrated embodiment, as shown in FIG. 1B, the electronic clutch assembly 40 includes the controller 42 and the sensor(s) 48, 50.

In one embodiment, the sensor(s) 48, 50 is/are configured to sense one or more power tool operation parameters.

In one embodiment, the electronic clutch assembly 40 includes one sensor 48, for example, the current sensor 48 that is configured to sense an amount of current being delivered to the electric motor 14. For example, in this embodiment, the power tool operation parameter includes the amount of current being delivered to the electric motor 14.

In another embodiment, the electronic clutch 40 includes two sensors 48, 50, where one sensor 48 is the current sensor 48 that is configured to sense an amount of current being delivered to the electric motor 14 and the other sensor 50 is a position/rotation sensor 50 that is configured to sense the changes in an angular position of the motor output shaft and that provides a signal corresponding to angular rotation, speed, and/or acceleration of the electric motor 14 to the controller 42 of the electronic clutch 40. For example, in this embodiment, the power tool operation parameters include the amount of current being delivered to the electric motor 14, the rotational speed of the electric motor 14, the rotation of the electric motor 14, the speed of the electric motor 14, and the acceleration of the electric motor 14.

The number of sensors in the electronic clutch 40 may vary. The sensors 48, 50 of the electronic clutch 40 are operatively coupled/connected to the electric motor 14 to sense the power tool operation parameters and are operatively coupled/connected to the controller 42. The sensors 48, 50 of the electronic clutch 40 are configured to send the sensed power tool operation parameters to the controller 42.

In illustrated embodiment, as shown in FIG. 1B, the electronic clutch assembly 40 includes the controller 42, a current sensing circuit 44, and a position sensing circuit 46. The current sensing circuit 44 includes the current sensor 48 (e.g., a shunt resistor) that senses the amount of current being delivered to the motor 14 and provides a current sensing signal corresponding to the sensed current to the controller 42. The position/rotation sensing circuit 46 includes one or more position/rotation sensors 50 that sense changes in an angular position of the motor output shaft and provides a signal corresponding to angular rotation, speed, and/or acceleration of the motor 14 to the controller 42.

In one embodiment, the position sensors are Hall sensors that are already part of a brushless motor. For example, the power tool 10 may include a three-phase brushless motor, where the rotor includes a four-pole magnet, and there are three Hall sensors positioned at 120° intervals around the circumference of the rotor. As the rotor rotates, each Hall sensor senses when one of the poles of the four-pole magnet passes over the Hall sensor. Thus, the Hall sensors can sense each time the rotor, and thus the motor output shaft, rotates by an increment of 60°.

In one embodiment, the rotation sensing circuit can use the signals from the Hall sensors to infer or calculate the amount of angular rotation, speed, and/or acceleration of the rotor. For example, the rotation sensing circuit includes a clock or counter that counts the amount of time or the number of counts between each 60° rotation of the rotor. The controller 42 is configured to use this information to calculate or infer the amount of angular rotation, speed, and/or acceleration of the motor 14.

In one embodiment, the power tool operation parameters generally include an amount of current being delivered to the electric motor 14, rotational speed of the electric motor 14, rotation of the electric motor 14, speed of the electric motor 14, acceleration of the electric motor 14, etc.

In one embodiment, as shown in FIG. 1B, the controller 42 of the electronic clutch 40 is coupled to the sensors 48, 50 and is configured to receive the power tool operation parameters from the sensors 48, 50 of the electronic clutch 40. The controller 42 of the electronic clutch 40 is configured to initiate a first protective operation to interrupt or reduce transmission of torque from the electric motor 14 to the output spindle 13 when the sensed power tool operation parameter exceeds a torque threshold value. That is, when conditions (the sensed power tool operation parameter exceeds the torque threshold value) triggering the first protective operation have been met, the controller 42 of the electronic clutch 40 is configured to interrupt or reduce torque transmission to the output spindle 13.

In one embodiment, the controller 42 of the electronic clutch 40 is configured to initiate the first protective operation when the sensed current signal exceeds a current threshold value In another embodiment, the controller 42 of the electronic clutch 40 is configured to initiate the first protective operation when the sensed rotation/position signal indicates that the rotational speed of the electric motor 14 is decreasing and the sensed current signal exceeds a first current threshold value. In another embodiment, the controller 42 of the electronic clutch 40 is configured to initiate the first protective operation only if the controller 42 of the electronic clutch 40 has previously determined that the sensed current signal exceeds a second current threshold value that is different than the first current threshold value.

In one embodiment, the first protective operation interrupts torque transmission to the output spindle 13 e.g., by interrupting power to the electric motor 14, reducing power to the electric motor 14, and/or actively braking the electric motor 14 (e.g., by shorting across the windings of the electric motor 14). The first protective operation comprises actuating a mechanical clutch element.

In one embodiment, a soft braking scheme is employed as the first protective operation. When conditions triggering the protective operation have been met, power to the electric motor 14 is cut off and the electric motor 14 is permitted to coast for a predefined period of time (e.g., 10-30 milliseconds). The PWM signal is then reapplied to the electric motor 14. The PWM signal is initially applied at a 100% duty cycle to the electric motor 14 and then gradually decreased to a much lower duty cycle (e.g., 3%). The PWM signal continues to be applied to the electric motor 14 for a period of time before being set of zero (i.e., interrupting power to the electric motor 14). It is envisioned that the PWM signal applied to the electric motor 14 during braking may be decreased linearly, exponentially, or in accordance with some other function from 100%. In other embodiments, the PWM signal may also be ramped up linearly, exponentially or in accordance with some other function from zero to 100%. Other variants for the soft braking of the motor are also contemplated by this disclosure. Moreover, in other embodiments, other types of protective operations fall with the scope of this disclosure.

In one embodiment, the controller 42 is also configured to initiate a second protective operation to interrupt or reduce transmission of torque to the output spindle 13 when the controller determines that the input switch 16 has been actuated a second time within a predetermined time after the first protective operation to continue driving a fastener after the first protective operation and the sensed current signal exceeds a second current threshold value that is less than the first current threshold value.

In one embodiment, the controller 42 of the electronic clutch 40 is configured to receive an input indicative of a clutch setting from the clutch selector 27 and to determine the torque threshold valve in accordance with the selected clutch setting.

The threshold values can be varied depending on one or more of the clutch setting, the selected speed of the transmission, and the duty cycle of the PWM signal (which corresponds to the amount of trigger travel). In illustrated embodiment, as shown in FIG. 1B, the electronic clutch 40 includes a memory 45 operatively coupled to the controller 42. The memory 45 may include a look-up table that correlates combinations of values for the clutch setting, the speed setting, and the PWM duty cycle, to the threshold values. The controller 42 is configured to use the look-up table to select one or more of the threshold values based upon the selected clutch setting, the selected speed setting, and the amount of trigger travel or PWM duty cycle. For example, in one embodiment, for clutch setting 1, speed setting 1, and a PWM duty cycle of 75-100% of maximum, there will first (set of) threshold values. In another embodiment, for clutch setting 3, speed setting 2, and a PWM duty cycle of 25-50% of maximum, there will be the second (set of) threshold values. In general, the threshold values increases with an increase in motor speed (caused by either an increase in duty cycle or a change in gear setting) as well as with an increase in the desired clutch setting. It should be understood that the threshold values in the look-up table may be derived empirically and will vary based on many factors such as the type of power tool, the size of the motor, the voltage of the battery, etc. In addition, it should be understood that the look-up table can include fewer parameters used to determine the threshold values (e.g., only clutch setting, but not speed setting or PWM duty)).

In one embodiment, the threshold values include a threshold value for the maximum angular position of the rotor, a threshold value for the minimum angular position of the rotor, a threshold value for the current when the fastener should be seated, a threshold value for the minimum current drawn by the motor 14, a threshold value for the maximum current drawn by the motor 14, etc. It should be understood that the look-up table can include only some of the above-discussed threshold values. It should be understood that the look-up table can include other types of threshold values that are not disclosed here but are obvious to a person of ordinary skill in the art. In addition, the look-up table may be divided into multiple look-up tables for different modes of operation.

In one embodiment, the clutch setting assembly 200 includes the variable resistive element 202 with a variable resistance fixedly coupled to the housing 12, the clutch selector 27 movable relative to the housing 12 to select a clutch setting, and the contact assembly 204. The contact assembly 204 of the clutch setting assembly 200 includes the contact pin 206 and the spring 208 that are non-removably coupled to the clutch selector 27 with the spring 208 biasing the contact pin 206 against the variable resistive element 202. The variable resistive element 202 is non-movable relative to the housing 12.

In one embodiment, the electronic clutch 40 includes a clutch setting circuit 52. The clutch setting circuit 52 includes a clutch setting sensor 56 that senses the setting set of the clutch selector/setting collar 27 and that provides a signal corresponding to that clutch setting to the controller 42. The clutch selector 27 comprises the collar rotatably coupled to the housing 12 and rotation of the collar 27 changes the selected clutch setting. The clutch selector 27 may be interchangeably referred to as the clutch collar 27. In illustrated embodiment, as illustrated in and described in detail below with respect to FIGS. 2-17, the clutch collar 27 is part of the clutch setting assembly 200 and is operatively coupled to the contact assembly 204 and the variable resistive element 202 (that are both part of the clutch setting assembly 200). The clutch setting sensor 56 may be in the form of the variable resistive element 202. The contact assembly 204 is affixed to the clutch collar 27 so that the contact assembly 204 rotates together with the clutch collar 27, while the variable resistive element 202 remains stationary. The spring 208 of the contact assembly 204 is configured to bias the contact pin 206 against the variable resistive element 202. The contact pin 206 of the contact assembly 204 has the head 226 that is configured to engage the variable resistive element 202 to generate a resistance signal that corresponds to a position of clutch setting collar 27. As the head 226 of the contact pin 206 moves along the variable resistive element 202, the resistance changes. Thus, by sensing the voltage at the output of the variable resistive element 202, the clutch setting circuit 52 can sense the position or clutch setting of the clutch collar 27. In other embodiments, the clutch collar 27 may be coupled to another type of potentiometer or variable resistor, to another type of sensor such as one or more Hall effect sensors, or using a switch, or to another type of switch such as a multi-pole switch, to sense position of the clutch collar 27.

The clutch setting circuit 52 includes the clutch setting assembly 200. The clutch setting switch/collar 27 is actuatable to select a clutch setting. The clutch setting circuit 52/the clutch setting assembly 200 is configured to generate a clutch setting signal that corresponds to the clutch setting. The clutch setting signal causes the controller 42 to adjust the threshold torque value in relationship to the clutch setting.

The clutch setting switch 27 includes a setting for a drill mode. When the clutch setting signal indicates that the clutch setting switch 27 is in the drill mode, the controller 42 deactivates the electronic clutch 40. The clutch setting switch 27 may include one or more settings for no-hub modes. When the clutch setting signal indicates that one or more of the no-hub modes has been selected, the controller 42 may limit the PWM duty cycle to be less than a maximum duty cycle (e.g., approximately 50% of the maximum duty cycle).

Referring to FIG. 1B, the electronic clutch assembly 40 also includes a speed selector circuit 54 that senses the position of the speed selector switch 29 to determine which speed setting has been selected by the user. The speed selector switch 29 is actuatable to select an output speed of the output spindle 13. The speed selector circuit 54 is configured to generate a speed selector signal that corresponds to a position of the speed selector switch 29. The speed selector signal causes the controller 42 to adjust the threshold torque value in relationship to the speed setting.

In one embodiment, the speed selector switch 29 is coupled to a member (e.g., pin) that is biased downwardly by a spring against a speed setting sensor 58 in the form of a linear variable resistive element (membrane potentiometer). The member and spring move linearly with the speed selector switch 29, while the linear variable resistive element remains stationary, such that the resistance of the linear variable resistive element changes with different speed settings. Thus, by sensing the voltage drop across the linear variable resistive element, the speed selector circuit 54 can sense the position or speed setting of the speed selector switch 29, and provides a signal corresponding to the speed setting to the controller 42. In other embodiments, the speed selector switch 29 may be coupled to another type of potentiometer or variable resistor, to another type of sensor such as one or more Hall effect sensors, or to another type of switch, such as a multi-pole switch, to sense position of the speed selector switch 29.

In one embodiment, the operation and the configuration of the controller, the sensors (position and/or current), the memory, and/or the transmission speed sensor shown in FIG. 1B of the present patent application are similar to the corresponding controller, sensors (position and/or current), memory, and/or transmission speed sensor described in detail in the '500 Patent, which is incorporated by reference in its entirety.

Figure 17:
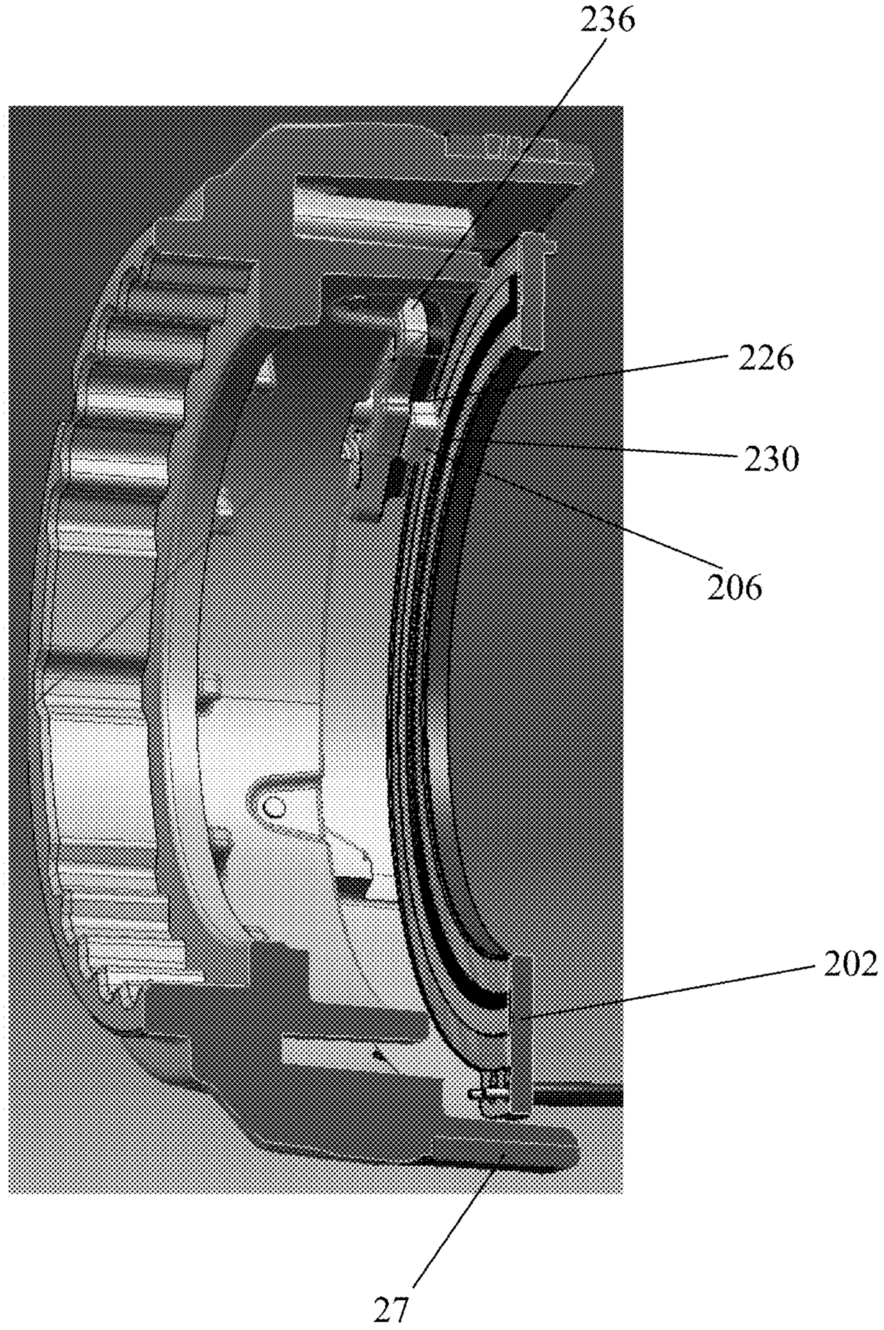
FIG. 17 shows the contact assembly engaging with a variable resistive element of the clutch setting assembly according to an embodiment of the present patent application.

In one embodiment, the clutch setting sensor 56 (as shown in FIG. 1B) is in the form of the variable resistive element 202. The variable resistive element 202 is configured to be fixedly coupled to the housing 12. The variable resistive element 202 is shown in FIGS. 17-19.

In one embodiment, the variable resistive element 202 includes a membrane potentiometer. The variable resistive element 202 has a variable resistance. The variable resistive element 202 comprises a flat, semi-conductive strip or membrane whose resistance changes when pressure is applied in different locations along the membrane.

Figure 18:
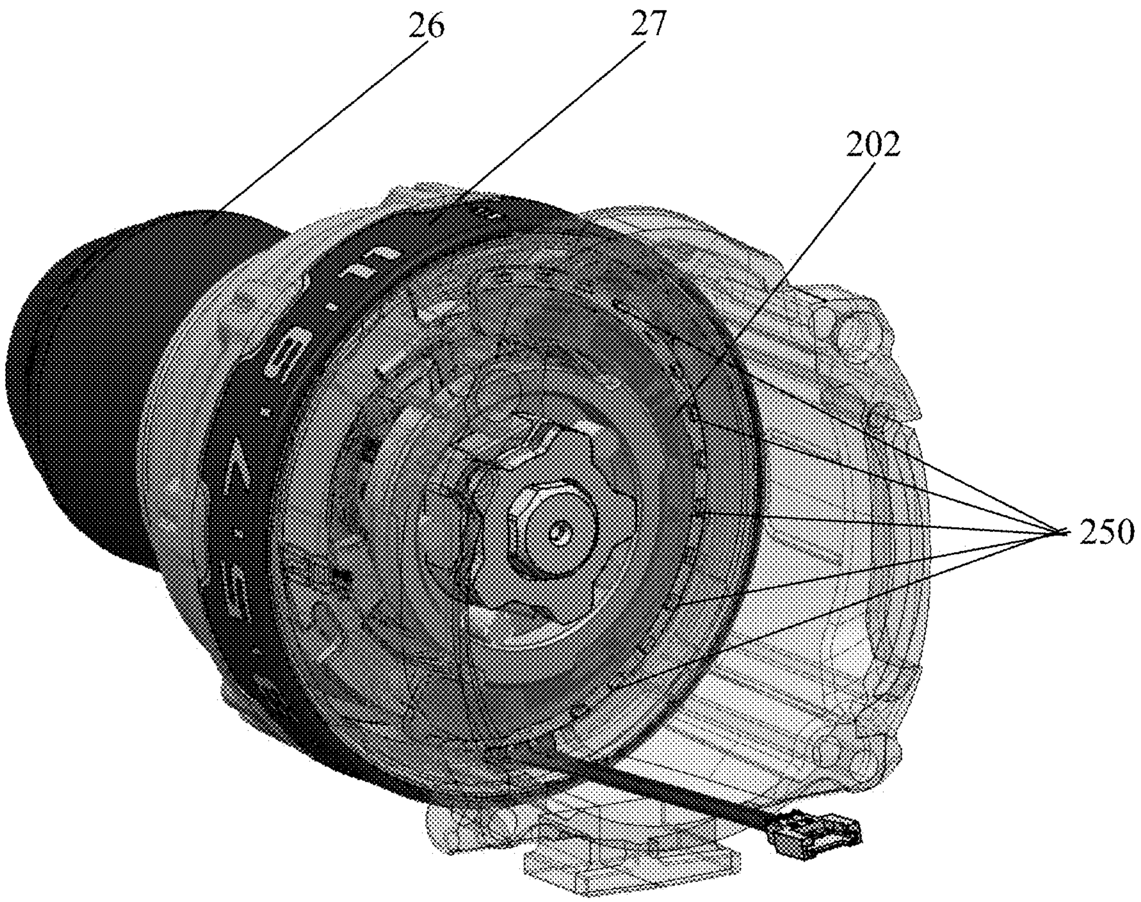
FIGS. 18 and 19 show back side of the variable resistive element (e.g., an electronic clutch printed circuit board) of the clutch setting assembly and radial placement of resistors on the variable resistive element of the clutch setting assembly according to an embodiment of the present patent application.

FIGS. 18-19 show the clutch setting assembly 200 from the back/rear side thereof. That is, FIGS. 18-19 show back side of the electronic clutch printed circuit board (PCB). In one embodiment, the variable resistive element 202 includes a plurality of conductive elements 250 circumferentially spaced apart on the variable resistive element 202. Resistance of the variable resistive element changes when pressure is applied by the portion (e.g., contact point 230) of the contact assembly 204 on one of the plurality of conductive elements 250 disposed along the variable resistive element 202. FIGS. 18-19 also show the radial placement of the multiple resistors or conductive elements 250 on the variable resistive element 202. In one embodiment, the membrane is composed of a variety of materials, such as PET, foil, FR4, and/or Kapton. The variable resistive element 202 may be in the form of an annular ring or a semi annular ring. The variable resistive element 202 may be in the form of a semi-circle or a full circle.

In one embodiment, the variable resistive element 202 is configured such that as the head 226 of the contact pin 206 moves along the variable resistive element 202 and the potentiometer contact point 230 of the head 226 engages different portions/locations of the variable resistive element 202, the resistance changes. Thus, by sensing the voltage at the output of the variable resistive element 202, the clutch setting circuit 52 can sense the position or clutch setting of the clutch collar 27.

In one embodiment, the power tool 10 includes the clutch setting switch or collar 27 that is used to adjust a clutch setting of the electronic clutch 40. The user is able to control the amount of slip, e.g., via the clutch setting collar 27. The clutch selector 27 is configured to receive a user selection of a clutch setting. The user rotates the clutch collar 27 among a plurality of different positions for different maximum torque settings. The clutch setting collar 27 may be interchangeably referred to as clutch setting input device, clutch setting switch, clutch collar, clutch selector or rotatable clutch collar. The electronic clutch 40 may include the rotatable clutch collar 27 for selecting the clutch setting.

In one embodiment, the clutch selector 27 is disposed on the housing 12. The clutch collar 27 is attached to the power tool 10 between the tool and the tool holder or chuck 26. The clutch selector 27 is configured to be movable relative to the housing 12 of the power tool 10 to select a clutch setting. The clutch selector 27 is configured to be rotatable relative to the housing 12 of the power tool 10 to select a clutch setting.

Figure 3:
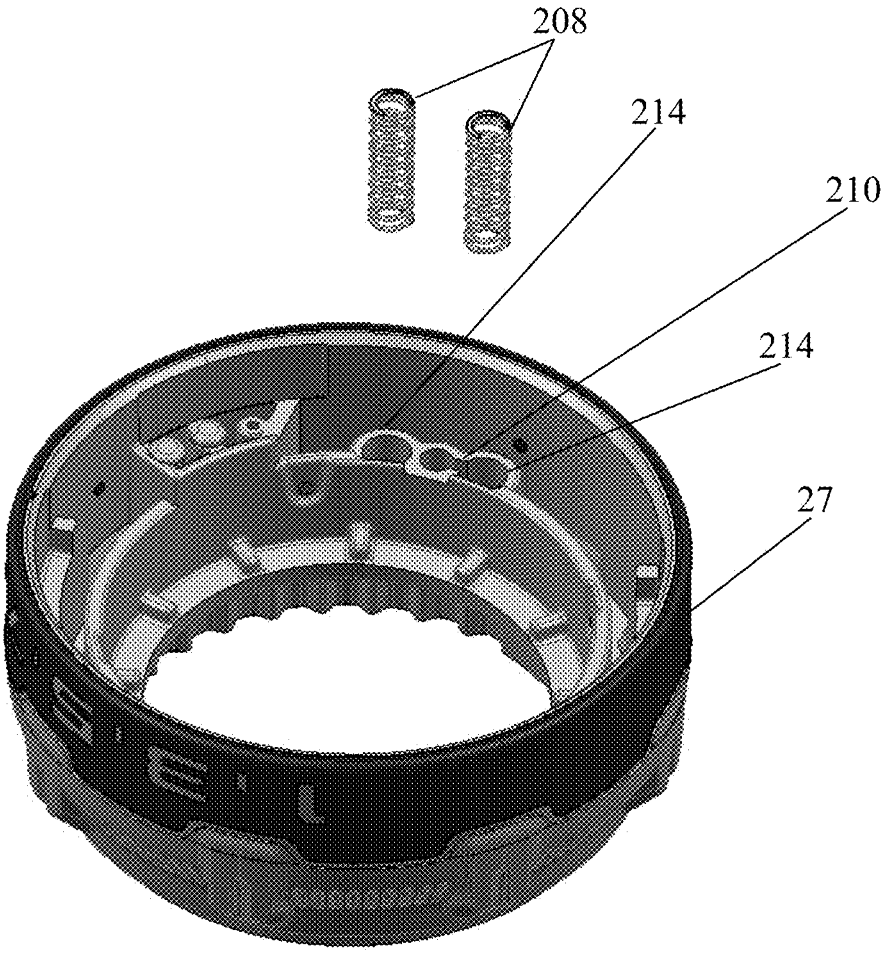
FIG. 3 shows the clutch setting assembly including the clutch selector and springs of the contact assembly according to an embodiment of the present patent application, where some portions of the clutch setting assembly are not shown to better illustrate other portions of the clutch setting assembly.
Figure 4:
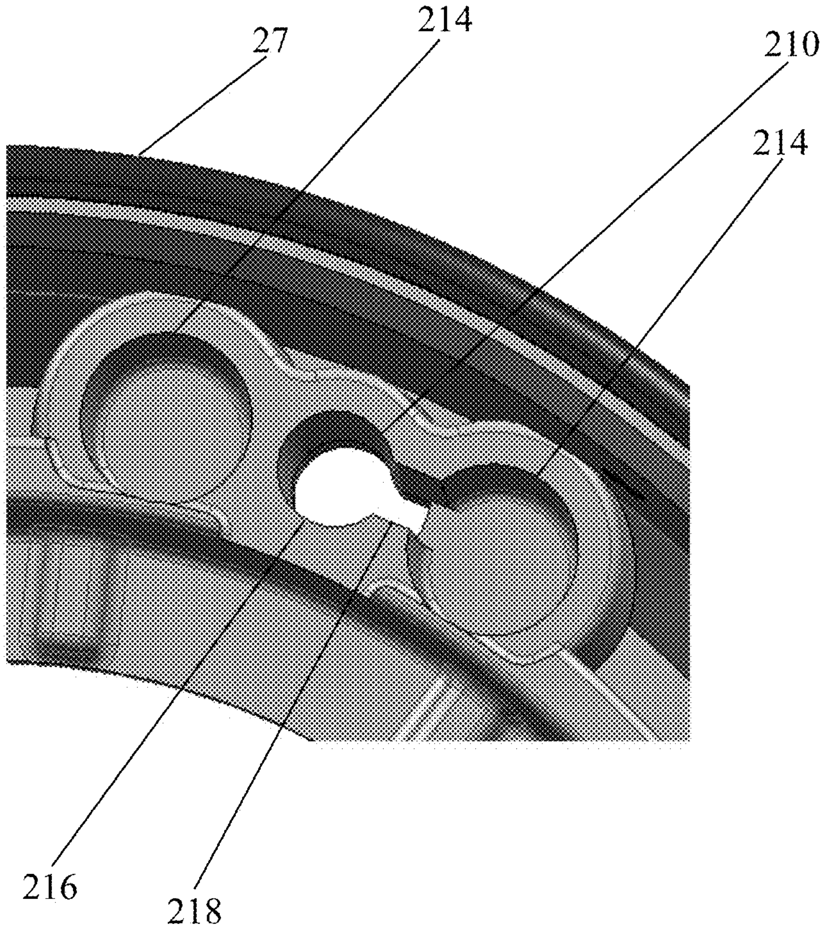
FIGS. 4 and 5 show partial views of the clutch selector according to an embodiment of the present patent application, where
Figure 5:
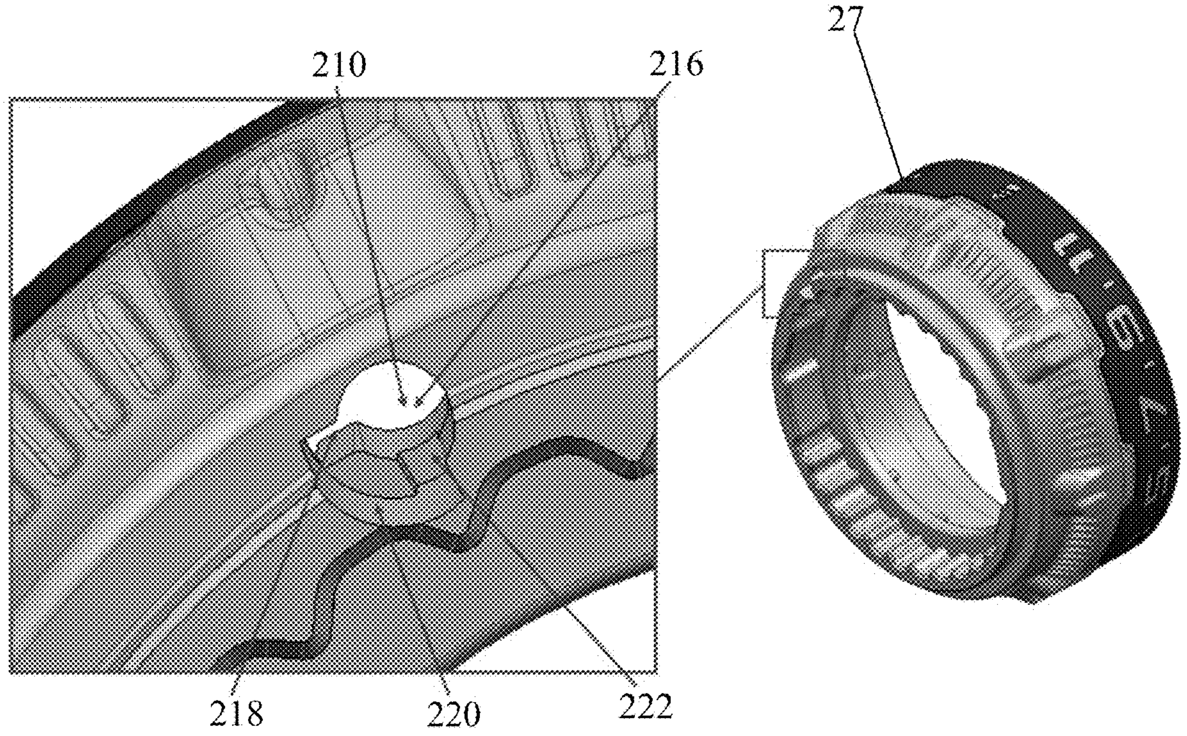

In one embodiment, as shown in FIGS. 3-5, the clutch collar 27 has a contact pin receiving portion/keyhole slot 210 that receives the contact pin 206 and that is flanked by a pair of spring receiving portions/spring pockets 214 that receive the springs 208. The contact pin receiving portion/keyhole slot 210 may interchangeably referred to as the opening 210 of the clutch collar 27. The shaft 224 of the contact member 206 is configured to be insertable into the opening 210 of the clutch collar 27. The spring 208 of the spring keeper 236 is received within the opening 214 of the clutch selector 27 and the leg 240 of the spring keeper 236 is received within the spring 208. A second spring 208 is received in a second (spring) opening 214 in the clutch selector 27. From the insertion side, as shown in FIG. 4, the keyhole slot 210 includes a round center portion 216 and a radial extension 218 facing one of the spring pockets 214. From the opposite retaining side, as shown in FIG. 5, the keyhole slot 210 has the round center portion 216, the radial extension 218, an arc shaped recess 220, and a retaining groove 222. The retaining groove 222 is disposed at an angle of 90° to the radial extension 218.

Figure 7:
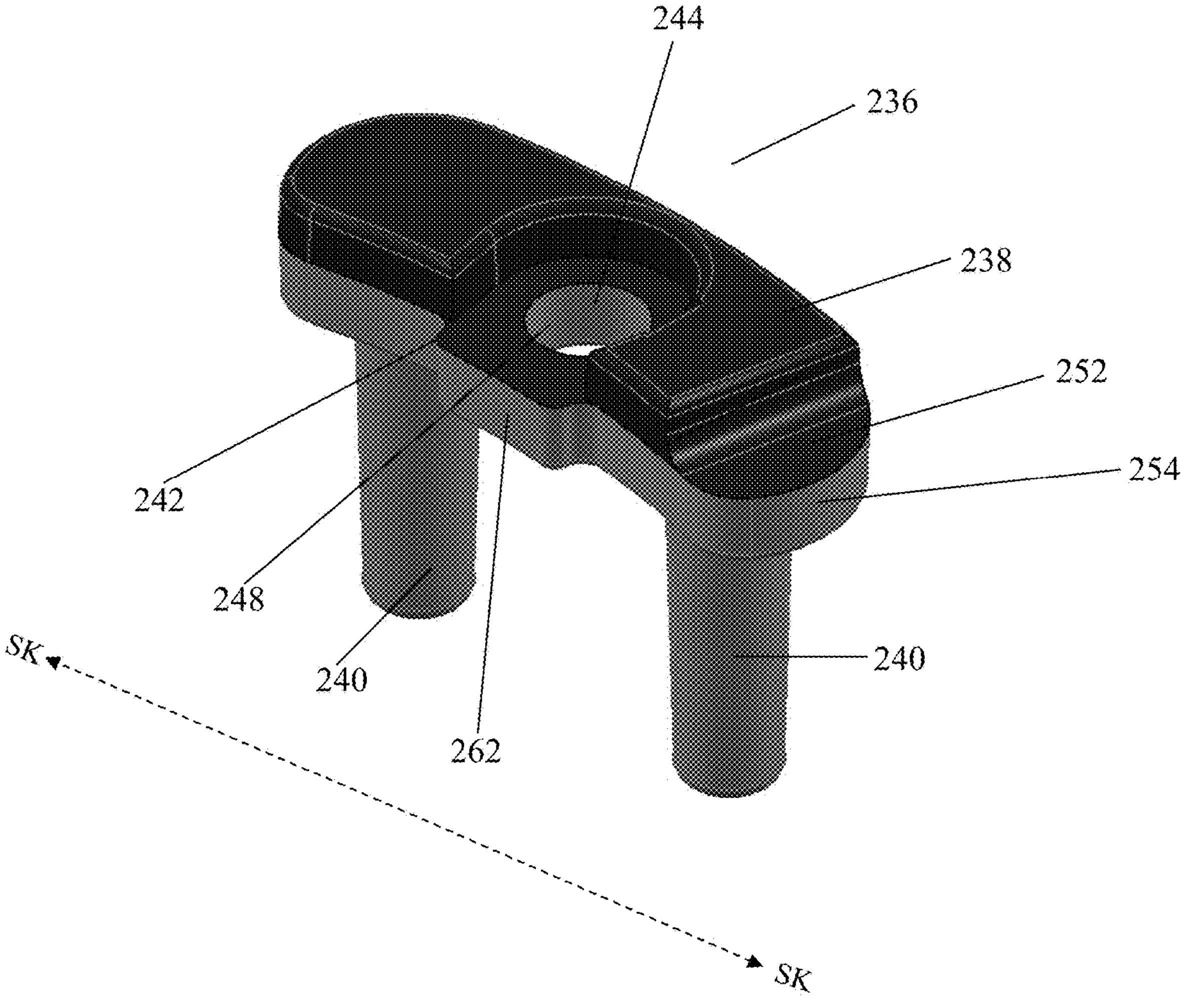
FIG. 7 shows a spring keeper of the contact assembly of the clutch setting assembly according to an embodiment of the present patent application.
Figure 8:
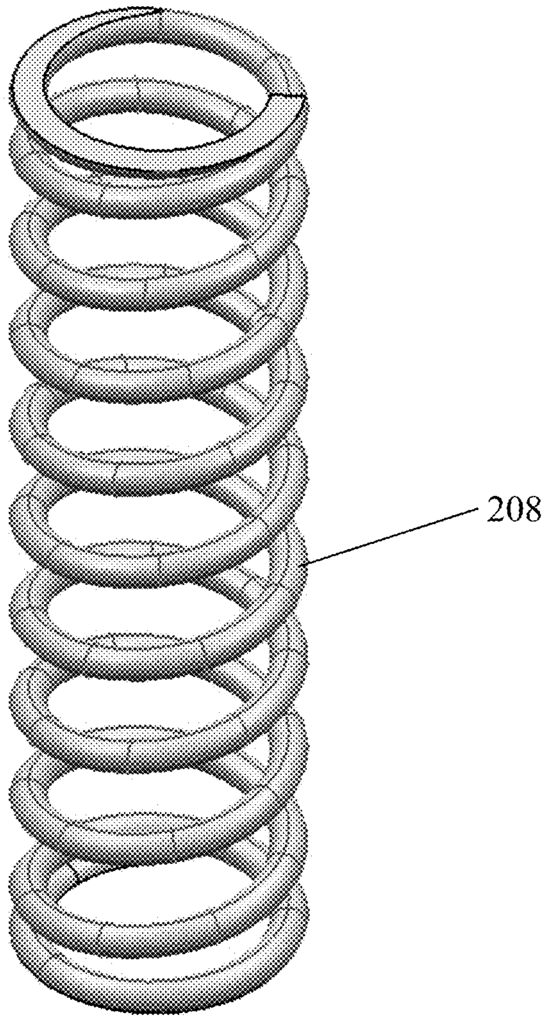
FIG. 8 shows an exemplary spring of the contact assembly of the clutch setting assembly according to an embodiment of the present patent application.

In the '500 Patent, the spring with the stylus-type projection (as shown in FIG. 7 of the '500 Patent) is configured to be pressed against the membrane potentiometer to enable the rotational position of the clutch collar to be sensed. Applicant of the present patent application has found that, however, often the spring 70 of the '500 Patent may fail over time, yielding inaccurate clutch setting signals.

Applicant of the present patent application has, therefore, developed the contact assembly 204 in the present patent application. Referring to FIGS. 2-7, the contact assembly 204 includes the contact pin 206, a spring keeper 236, and a pair of compression springs 208 all received in and retained by the clutch selector 27. The contact assembly 204, including the contact pin 206, the spring keeper 236, and the springs 208 received in the clutch selector 27, is configured to provide a more robust contact assembly, while also having a design that provides for ease of assembly by allowing the contact pin 206 to be retained in the clutch collar 27 in a manner so that contact pin 206 can be held upside down without the contact pin 206 falling out. The spring keeper 236 is coupled to the spring 208. The contact pin 206 coupled to the spring keeper 236. The contact pin 206 is moveable relative to the spring keeper 236 to non-removably retain the spring 208, the spring keeper 236, and contact pin 206 relative to the clutch selector 27.

The contact assembly 204 may interchangeably be referred to as contact pin assembly. The contact assembly 204 includes the contact member/pin 206 and the spring 208 that are non-removably coupled to the clutch selector 27 such that the contact assembly 204 rotates along with the clutch selector 27.

Figure 6:
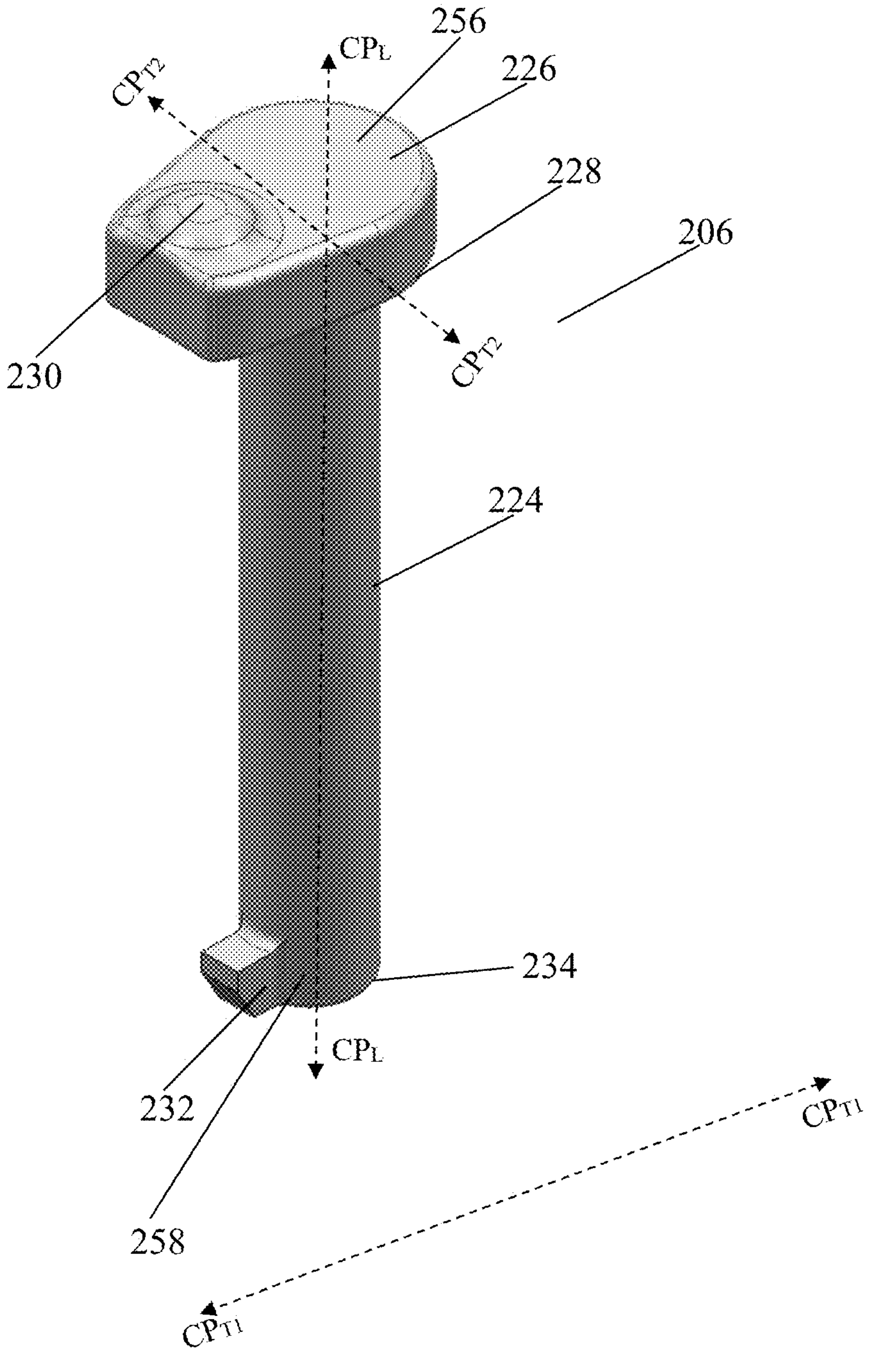
FIG. 6 shows the contact pin of the contact assembly of the clutch setting assembly according to an embodiment of the present patent application.

In illustrated embodiment, as shown in FIG. 6, the contact pin 206 includes the shaft 224 and the head 226 at one end 228 of the shaft 224. The head 226 of the contact pin 206 is asymmetrical. The head 226 of the contact pin 206 includes the contact point 230. The contact point 230 is configured to engage with portions of the variable resistive element 202 when the springs 208 of the contact assembly 204 bias the contact pin 206 against variable resistive element 202. The contact point 230 may be interchangeably referred to potentiometer contact point. The contact point 230 is configured to extend/protrude, along the longitudinal axis $CP_L$-$CP_L$ of the contact pin 206, outwardly and away from the surface 256 of the asymmetric head 226.

In illustrated embodiment, as shown in FIG. 6, the contact pin 206 also includes a catch 232 at an opposite end 234 of the shaft 224. The catch 232 is configured to extend/protrude, along the first transverse axis $CP_{T1}$-$CP_{T1}$ of the contact pin 206, outwardly and away from the external surface 258 of the shaft 224 of the contact pin 206. The catch 232 of the contact pin 206 may interchangeably referred to as key 232. That is, the contact pin 206 includes the shaft 224 that includes the key 232.

In one embodiment, the head 226 of the contact pin 206 is asymmetric about the longitudinal axis $CP_L$-$CP_L$ of the contact pin 206 and the second transverse axis $CP_{T2}$-$CP_{T2}$ of the contact pin 206. In another embodiment, the head 226 of the contact pin 206 is symmetric about the first transverse axis $CP_{T1}$-$CP_{T1}$ of the contact pin 206.

In one embodiment, the asymmetrical shaped configuration of the head 226 of the contact pin 206 and the outwardly extending/protruding contact point 230 of the contact pin 206 are configured to enable the engagement of the head 226/the contact point 230 of the contact pin 206 with the variable resistive element 202, when the contact pin 206 is biased by the springs 208, so as to generate the resistance signal that corresponds to the position of the clutch selector 27.

As will be clear from the detailed discussions below, the catch 232 of the contact pin 206 is configured to engage with portions of the clutch selector 27 so as to non-removably couple the contact assembly 204 (including the contact pin 206 and the springs 208) to the clutch selector 27.

In one embodiment, the contact pin 206 may be made of a material that is configured to withstand the vibrations and/or other forces in the power tool 10. In one embodiment, the contact pin 206 is made of impact resistance material or impact absorbing material.

In one embodiment, the contact assembly 204 includes the pair of springs 208 that is received in and is non-removably coupled to the clutch collar 27. The springs 208 are compression springs. The pair of compression springs 208 is received in the spring pockets 214 of the clutch collar 27 and is configured to receive a pair of lateral legs 240 of a spring keeper 236 therein. The diameter of each of the pair of compression springs 208 is sized to fit into the corresponding spring pockets 214 of the clutch collar 27 and also sized to receive the corresponding one of the pair of lateral legs 240 of the spring keeper 236 in the assembled configuration of the contact assembly 204. The pair of compression springs 208 is positioned symmetrically on both sides of the contact pin 206.

In one embodiment, the pair of the springs 208 of the contact assembly 204 is configured to bias the contact pin 206 against the variable resistive element 202. The two compression springs 208 are configured to work together to produce a minimum force of approximately 11 Newton (N). In another embodiment, the minimum force produced by the spring 208 is up to 5, 10, 15 or 20 percent greater than or up to 5, 10, 15 or 20 percent less than the value described above.

In one embodiment, the springs 208 may be made of a material that is configured to withstand the vibrations and/or other forces in the power tool 10. In one embodiment, the springs 208 are made of impact resistance material or impact absorbing material.

In illustrated embodiment, referring to FIG. 7, the contact assembly 204 includes the spring keeper 236. The spring keeper 236 has a top plate/member 238, the pair of lateral legs 240 extending downward from the top plate/member 238, a recess 242 configured for receiving the head 226 of the contact pin 206, and a keyhole slot 248 configured for receiving portions of the contact pin 206 therethrough.

In one embodiment, the diameter of each of the pair of lateral legs 240 is sized to fit into the corresponding springs 208 in the assembled configuration of the contact assembly 204. When the contact assembly 204 is assembled and is non-removably coupled to the clutch collar 27, the pair of lateral legs 240 are aligned and received in the compression springs 208.

In one embodiment, the recess 242 includes the same shaped configuration as the head 226 of the contact pin 206 such that the recess 242 acts as an alignment feature for the contact pin 206 in the assembled configuration of the contact assembly 204.

In one embodiment, the spring keeper 236 includes a protrusion portion 262 that is disposed centrally (along the longitudinal axis SK-SK) in the top plate/member 238 and extending outwardly from the top plate/member 238. The protrusion portion 262 of the spring keeper 236 is configured to act as an alignment feature for the spring keeper 236 when the spring keeper 236 is pressed down to be flush with the clutch collar 27 so as to rotate the contact pin 206 and to align the catch 232 of the contact pin 206 with the retaining groove 222 in the clutch collar 27. The retaining groove 222 in the clutch collar 27 may interchangeably referred to as slot 222 or the undercut in the opening 210. That is, the clutch selector 27 includes the slot/retaining groove 222, whereby rotation of the contact pin 206 causes the key/catch 232 to engage the slot/retaining groove 222 to non-removably couple the contact pin 206 to the clutch selector 27.

Figure 13:
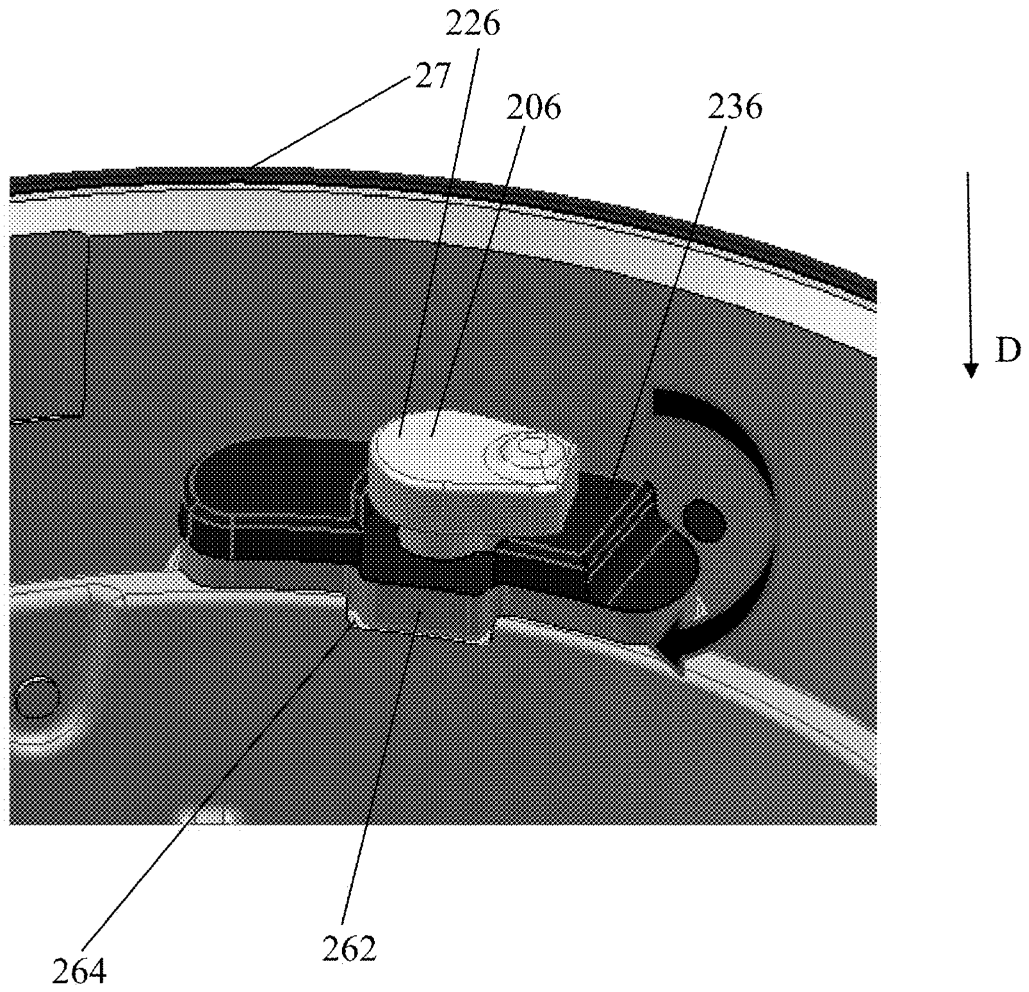

In one embodiment, the protrusion portion 262 of the spring keeper 236 is configured to align with and inserted into receiver portion 264 (as shown in FIG. 13) of the clutch collar 27 when the spring keeper 236 is pressed down to be flush with the clutch collar 27 so as to rotate the contact pin 206 and to align the catch 232 of the contact pin 206 with the retaining groove 222 in the clutch collar 27.

In one embodiment, the recess 242 and the keyhole slot 248 are positioned between the pair of lateral legs 240 along the longitudinal direction SK-SK of the spring keeper 236. The keyhole slot 248 of the spring keeper 236 includes a round center portion 244 and a radial extension 246 (e.g., FIG. 12). The keyhole slot 248 of the spring keeper 236 includes the same shaped configuration as the keyhole slot 210 in the clutch collar 27 such the round center portions and radial extensions of the keyhole slot 248 of the spring keeper 236 and the keyhole slot 210 in the clutch collar 27 align with each other to receive portions of the contact pin 206 therein.

The spring keeper 236 may be made of a material that is configured to withstand the vibrations in the power tool 10. The spring keeper 236 is made of impact resistant material or impact absorbing material. The spring keeper 236 may also interchangeably referred to contact assembly housing/receiving member.

In one embodiment, the spring keeper 236 includes a cutout portion 252 at one end 254 of the top plate/member 238 to remove excess material of the spring keeper 236. In another embodiment, the cutout portion 252 is optional.

FIGS. 9-16 show various procedures in a method of assembling the contact assembly 204 of the clutch setting assembly 200 and non-removably coupling the contact assembly 204 of the clutch setting assembly 200 to the clutch selector 27 according to an embodiment of the present patent application.

Figure 9:
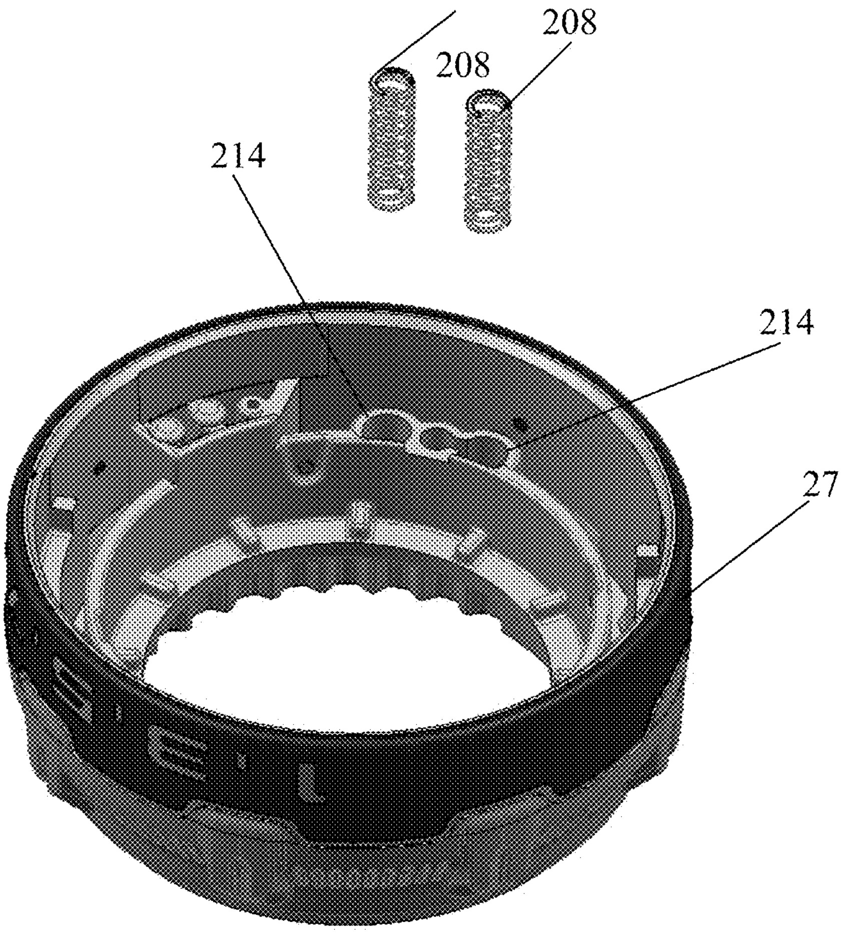
FIGS. 9-16 show various procedures in a method of assembling the contact assembly of the clutch setting assembly and non-removably coupling the contact assembly of the clutch setting assembly to the clutch selector according to an embodiment of the present patent application, where
Figure 10:
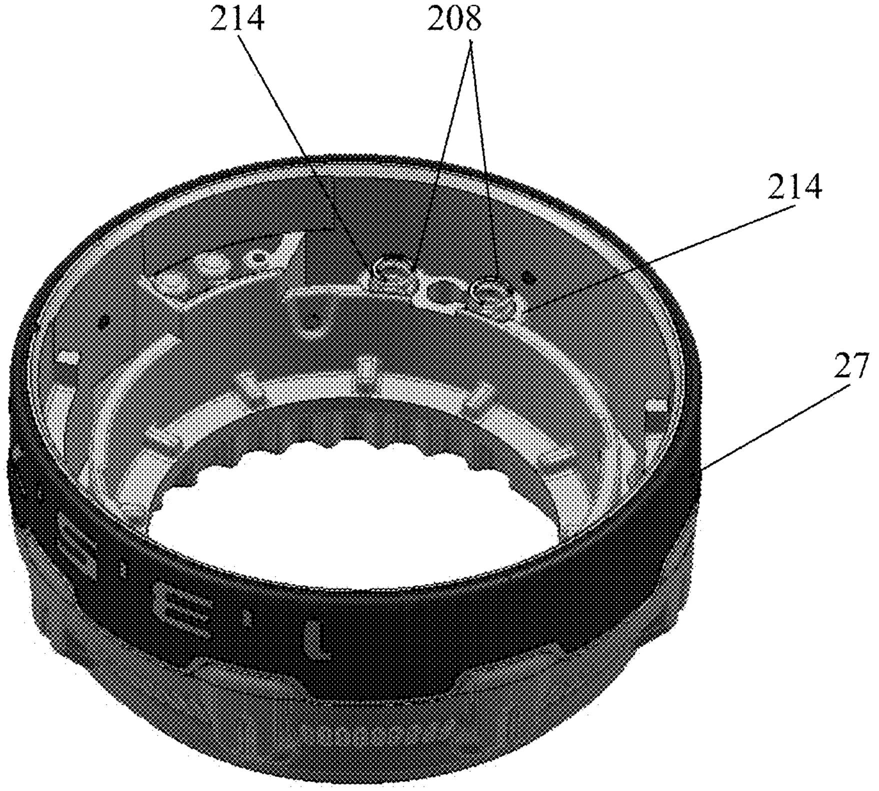

FIGS. 9 and 10 show the clutch selector 27 before and after the springs 208 being inserted/received therein, respectively. In one embodiment, the springs 208 of the contact assembly 204 are inserted into the spring pockets 214 in the clutch selector/collar 27.

Figure 11:
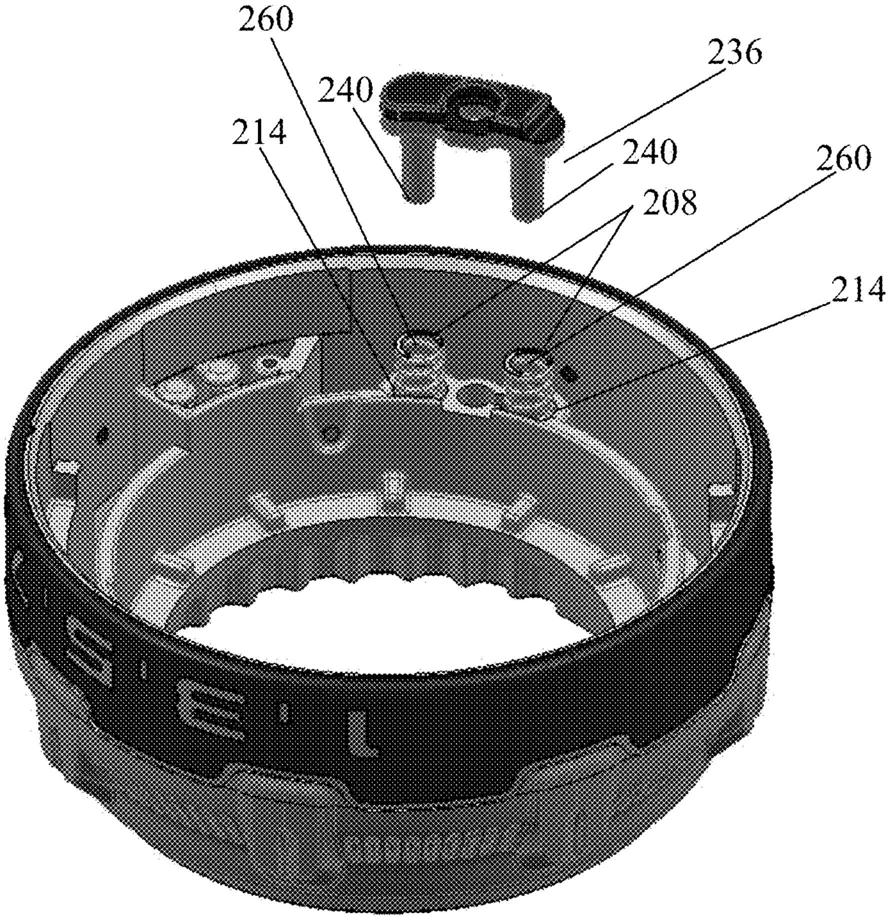

FIGS. 11 and 12 show the clutch selector 27 before and after the spring keeper 236 being inserted therein, respectively. In one embodiment, the legs 240 of the spring keeper 236 are inserted into the openings 260 of the springs 208, which are inserted in the spring pockets 214 in the clutch selector/collar 27. After the spring keeper 236 is inserted into the clutch selector 27 as shown in FIG. 12, the keyhole slot 210 in the clutch selector/collar 27 is aligned with the keyhole slot 248 in the spring keeper 236. After the spring keeper 236 is inserted into the clutch selector 27 as shown in FIG. 12, the round center portion 216 and the radial extension 218 of the keyhole slot 210 in the clutch selector/collar 27 are aligned with the round center portion 244 and the radial extension 246 of the keyhole slot 248 in the spring keeper 236.

FIGS. 12 and 13 show the clutch selector 27 before and after the contact pin 206 being inserted therein, respectively. In one embodiment, the catch 232 of the contact pin 206 is aligned with and inserted into the radial extension 218 of the keyhole slot 210 in the clutch selector/collar 27 and the radial extension 246 of the keyhole slot 248 in the spring keeper 236 as the contact pin 206 is inserted through the keyhole slot 248 in the spring keeper 236 and the keyhole slot 210 in the clutch selector/collar 27.

FIG. 13 also shows the contact pin 206 and the spring keeper 236 pressed down to be flush with the clutch selector 27 so as to rotate the contact pin 206 to align the catch 232 of the contact pin 206 with the retaining groove 222 (as shown in FIG. 5) of the clutch selector 27. The contact pin 206 and the spring keeper 236 are pressed downwardly in the direction D toward the clutch selector/collar 27 and against the force of the springs 208. The protrusion portion 262 of the spring keeper 236 aligns with and inserted into receiver portion 264 of the clutch collar 27 when the contact assembly 204 (including the contact pin 206, the spring keeper 236, and the springs 208) is pressed down to be flush with the clutch collar 27. The contact pin head 226 is then rotated, in the direction CR, by an angle of 90° to align the catch 232 of the contact pin 206 with the retaining groove 222 (as shown in FIG. 5) in the underside of the clutch selector/collar 27.

Figure 14:
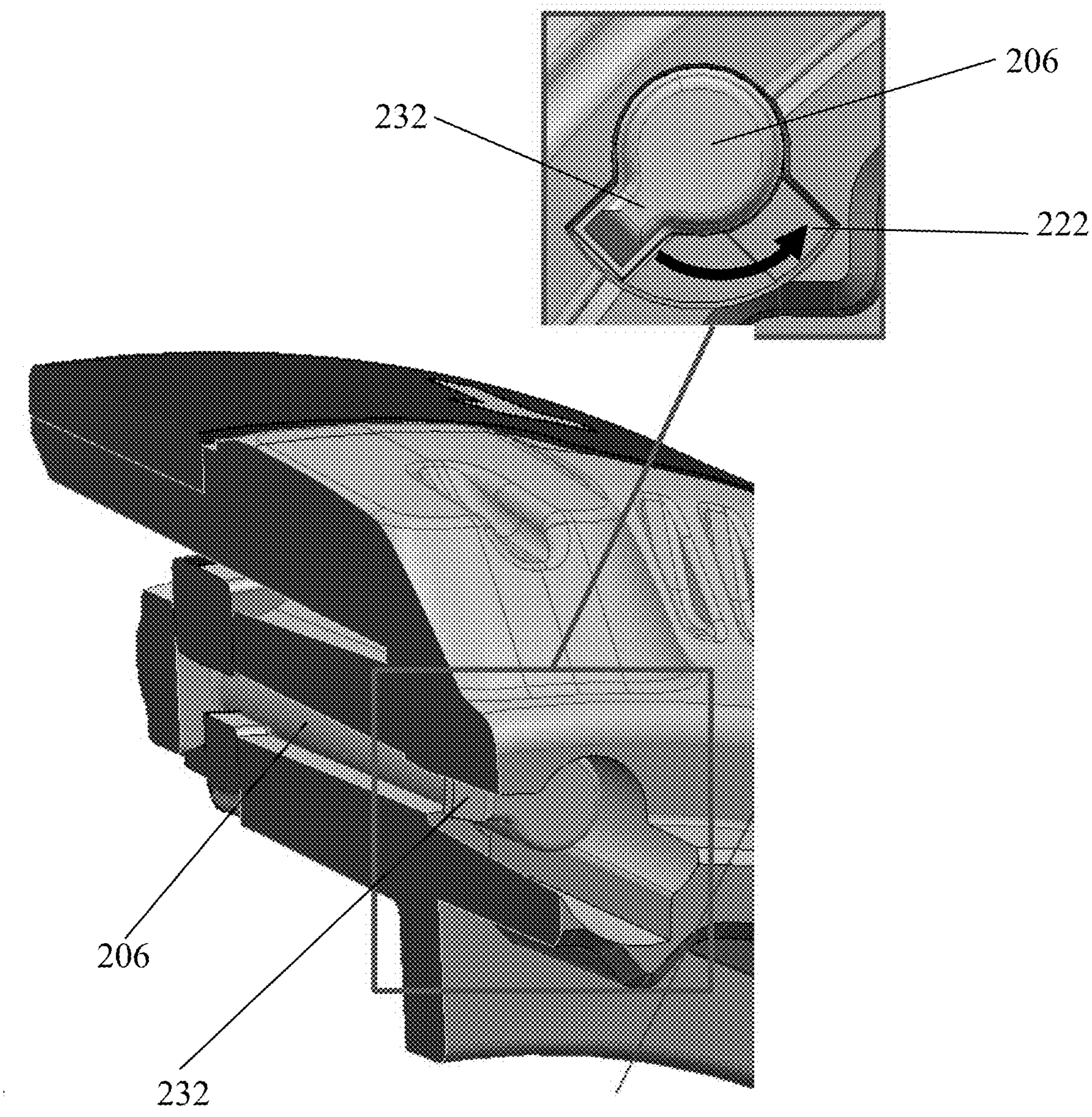
Figure 15:
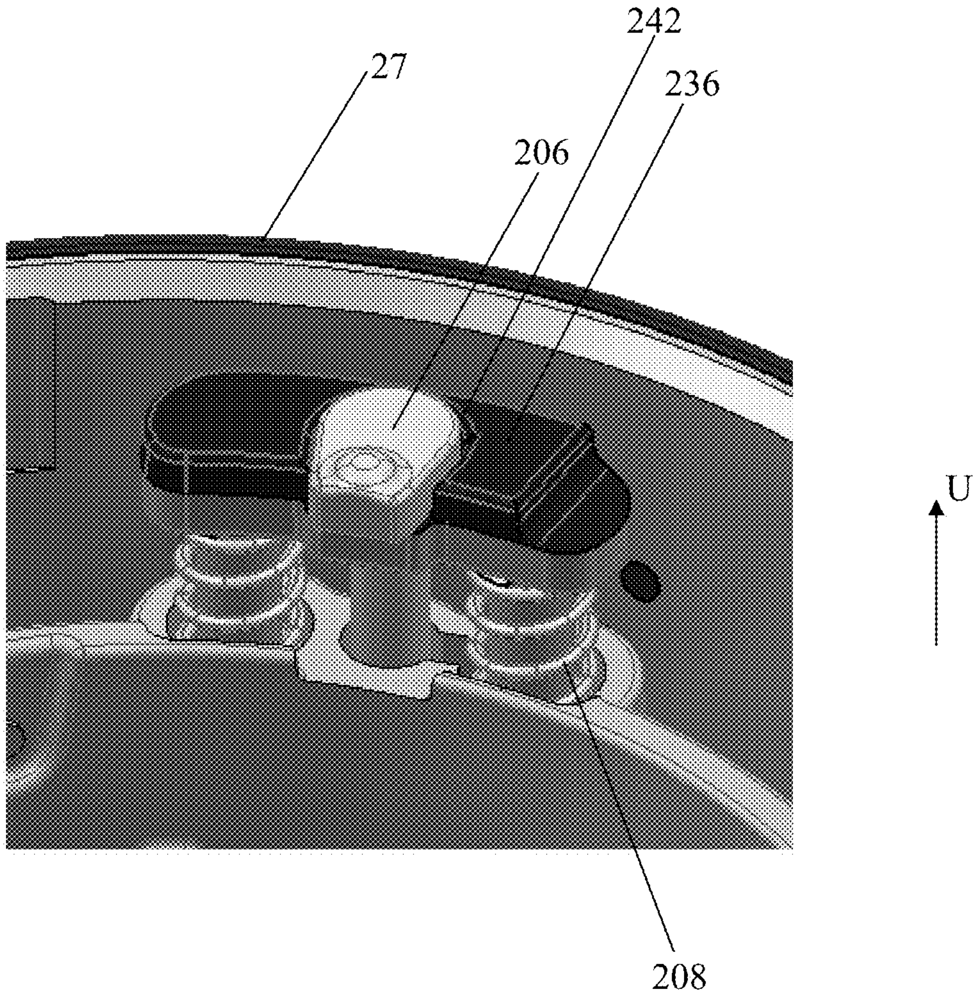
Figure 16:
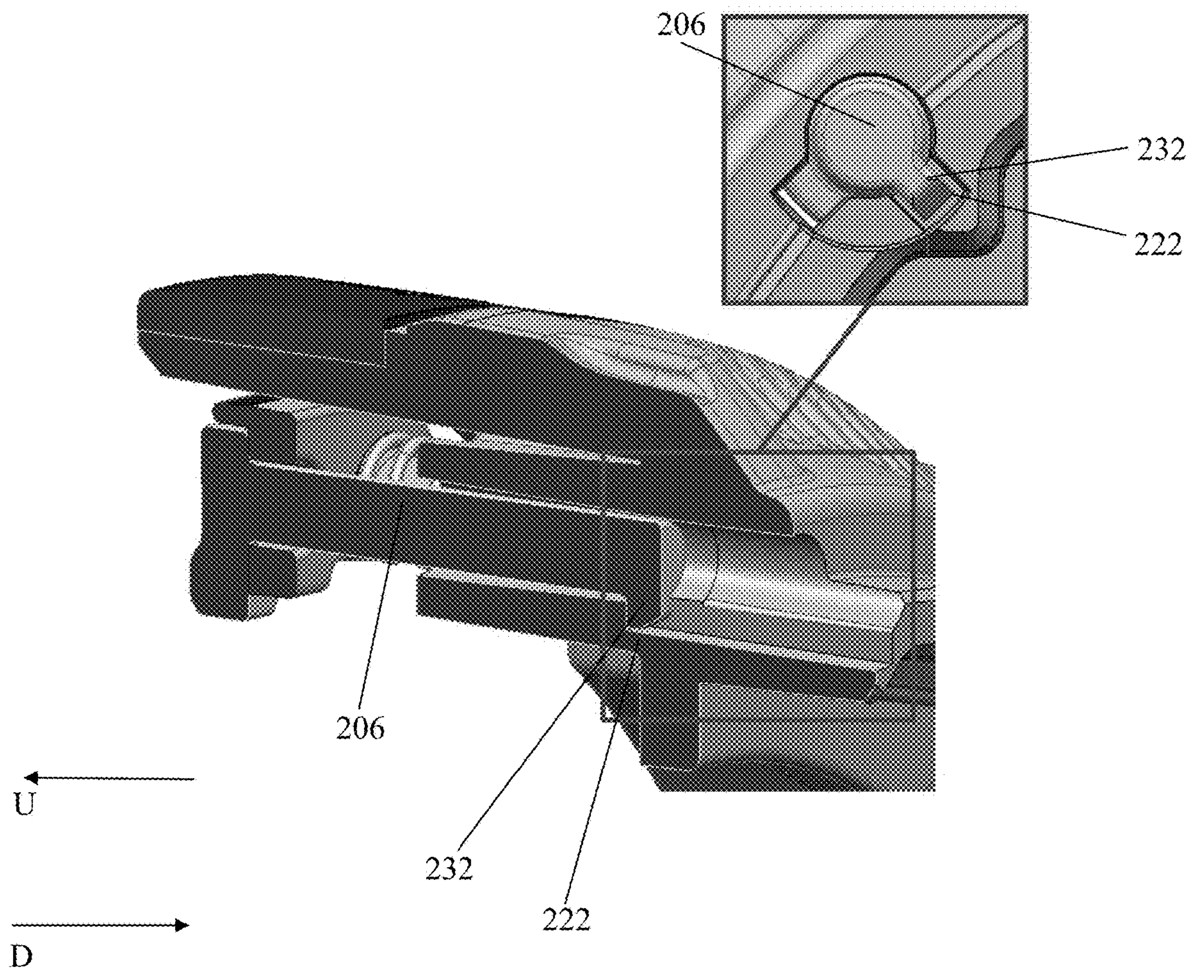

FIGS. 14 and 16 show the catch 232 of the contact pin 206 of the contact assembly 204 before and after being retained by the retaining groove 222 of the clutch selector 27, respectively. FIG. 15 shows the contact assembly 204 including the contact pin 206 and the spring keeper 236 in its released and retained position.

Once the catch 232 of the contact pin 206 is aligned with and received in the retaining groove 222 in the underside of the clutch selector/collar 27, the contact assembly 204 (including the contact pin 206, the springs 208 and the spring keeper 236) is released (upwardly in the direction U). The catch 232 of the contact pin 206 now abuts against (the top of) the retaining groove 222 of the clutch selector 27, which retains the contact assembly 204 (including the contact pin 206, the springs 208 and the spring keeper 236) in the clutch selector/collar 27 (e.g., see FIG. 16). The catch 232 of the contact pin 206 interfaces with the retaining groove 222 of the clutch 27 and keeps the contact assembly 204 (including the contact pin 206, the springs 208 and the spring keeper 236) retained in the clutch selector/collar 27. The recess 242 of the spring keeper 236 acts as an alignment feature for the contact pin 206 in the assembled configuration of the contact assembly 204.

In one embodiment, the clutch selector/collar 27 is then assembled to the power drill housing 12, so that the contact point 230 on the head 226 of the contact pin 206 engages or makes contact with the variable resistive element/membrane potentiometer 202 in the power drill housing 12 (e.g., see FIG. 17).

FIG. 17 shows the clutch setting assembly 200 including the contact assembly 204 (including the contact pin 206, the springs 208 and the spring keeper 236), the clutch selector 27, and the variable resistive element 202. FIG. 17 shows the contact point 230 on the head 226 of the contact pin 206 making contact with the potentiometer/variable resistive element 202 for the electronic clutch 40. In one embodiment, the springs 208 bias the contact pin assembly 204 toward the variable resistive element/membrane potentiometer 202 to keep good contact between the contact point 230 of the contact pin head 226 and the variable resistive element/membrane potentiometer 202.

In one embodiment, as the clutch collar 27 rotates to change the clutch setting, the head 226 of the contact pin 206 moves along with the clutch collar 27 to engage the contact point 230 on the head 226 of the contact pin 206 at a different location of the variable resistive element/membrane potentiometer 202. This engagement changes the resistance of the variable resistive element/membrane potentiometer 202, allowing the controller 42 for the electronic clutch 40 to sense the position of the clutch collar 27.

In one embodiment, when the contact assembly 204 is in its assembled configuration, the bottom portions of the springs 208 are received in/engaged with portions of the clutch selector 27 and the top portions of the springs 208 are configured to engage with bottom surfaces of the top plate/member 238 of the spring keeper 236 and to exert an axial (i.e., away from the clutch selector 27) force on the top plate/member 238 of the spring keeper 236 so as to bias the spring keeper 236 upwardly, along an axial/longitudinal axis A-A (as shown in FIG. 12). In one embodiment, the axial (i.e., away from the clutch selector 27) force is exerted by the springs 208 on the spring keeper 236 and also on the contact pin 206 received in the spring keeper 236. In one embodiment, the axial/longitudinal axis A-A is an axis parallel to the longitudinal axis of the contact pin $CP_L$-$CP_L$.

As described in detail throughout the present patent application, in one embodiment, the axial (i.e., away from the clutch selector 27) force is exerted by the springs 208 on the contact pin 206 received in the spring keeper 236 causes the contact point 230 of the contact pin 206 to engage with the variable resistive element 202. As the contact assembly 204 rotates along with the clutch selector 27, the contact pin 206 is configured to engage with different portions of the variable resistive element 202. The engagement between the variable resistive element 202 and the contact pin 206 causes a resistance signal that corresponds to a position of the clutch selector 27. The controller 42 is configured to receive this resistance signal and, based on the resistance signal, is configured to look-up, receive, or generate the torque threshold value for the power tool operation parameter that corresponds to the selected clutch setting.

In one embodiment, the potentiometer contact point 230 of the pin 206 is positioned at a radially inwardly portion (i.e., away from the clutch selector 27) on the head 226 so as to engage with the variable resistive element 202.

In one embodiment, the asymmetrical shaped configuration of the head 226 of the contact pin 206 and the outwardly extending/protruding contact point 230 of the contact pin 206 are configured to enable the engagement of the head 226/the contact point 230 of the contact pin 206 with the variable resistive element 202, when the contact pin 206 is biased by the springs 208, so as to generate the resistance signal that corresponds to the position of the clutch selector 27.

In one embodiment, the contact pin 206 and the springs 208 are two different structural members. The contact assembly 204 (including the contact pin 206 and the springs 208) is a two-part configuration. The two-part spring loaded configuration includes pin with spring inside it.

Each compression spring 208 of the present patent application undergoes an axial movement (in the axial direction with respect to the longitudinal direction of the pin shaft) to exert an axial/longitudinal bias on the contact pin 206 and its potentiometer contact point 230. The axial bias of springs 208 impart axial movement of the contact point against the potentiometer/variable resistive element 202.

In one embodiment, the electronic clutch assembly 40 includes a plurality of clutch settings. Each clutch setting corresponds to a desired output operation of the power tool 10. That is, the clutch setting of the electrostatic clutch 40 can be set by the user based on a desired output operation. For example, the desired output operation can include an amount of material to be removed from a workpiece (not shown). Each clutch setting has the set or predetermined torque. Each clutch setting is associated with a different clutch disengage torque (i.e., a torque at which the electronic clutch assembly 40 disengages to thereby prevent the transmission of torque transmission between the motor 14 and the output shaft 13). Each predetermined clutch setting includes a maximum clutch setting, a minimum clutch setting, and a plurality of intermediate clutch settings between the maximum and minimum clutch settings.

In one embodiment, the power tool/drill/driver 10 is configured to provide a user perceptible output that indicates the occurrence of the protective operation. In one example embodiment, the user is provided with haptic feedback to indicate the occurrence of the protective operation. By driving the motor 14 back and forth quickly between clockwise and counter-clockwise, the motor 14 can be used to generate a vibration of the housing that is perceptible to the tool operator. The magnitude of a vibration is dictated by a ratio of on time to off time; whereas, the frequency of a vibration is dictated by the time span between vibrations. The duty cycle of the signal delivered to the motor is set (e.g., 10%) so that the signal does not cause the motor to rotate. In the case of a conventional H-bridge motor drive circuit, the field effect transistors in the bridge circuit are selectively open and closed to change the current flow direction and therefore the rotational direction of the motor 14.

In another example embodiment, the haptic feedback is generated using a different type of pulsing scheme. Rather than waiting to reach the maximum threshold value, the control algorithm can begin providing haptic feedback prior to reaching the maximum threshold value. The feedback is triggered when the torque (as indicated for example by the monitored current) reaches a trip current that is set at a value lower than the maximum threshold current. The value of the trip current may be defined as a function of the trigger position, transmission speed and/or clutch setting in a manner similar to the other threshold values.

Figure 20A:
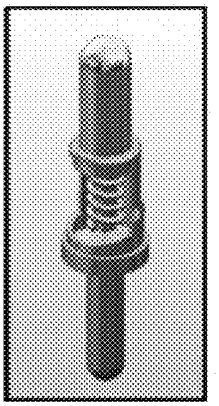
FIGS. 20A-D show different exemplary contact assemblies/spring loaded contact pin arrangements including a through hole spring loaded contact pin arrangement, a surface mount spring loaded contact pin arrangement, a barrel crimp spring loaded contact pin arrangement, and a solder cup spring loaded contact pin arrangement according to embodiments of the present patent application.
Figure 20B:
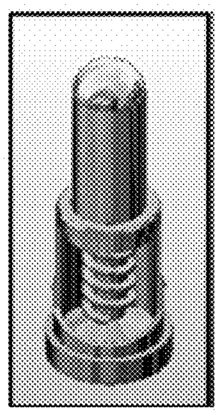
Figure 20C:
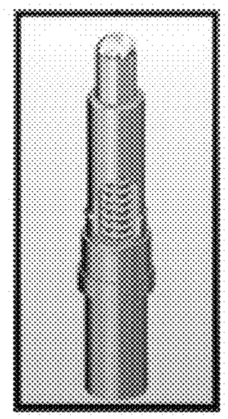
Figure 20D:
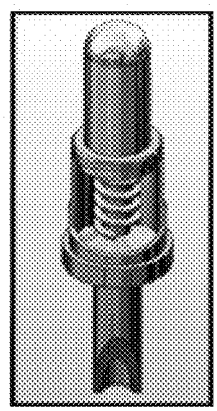

In one embodiment, as shown in FIGS. 20A-D, the spring loaded pin arrangement/contact assembly 204 includes other spring loaded pin configurations including through hole spring loaded pin arrangement (as shown in FIG. 20A), surface mount spring loaded pin arrangement (as shown in FIG. 20B), barrel crimp spring loaded pin arrangement (as shown in FIG. 20C), solder cup spring loaded pin arrangement (as shown in FIG. 20D) and/or other spring loaded pin arrangements that are appreciated by a person of ordinary skill in the art. Each of these spring loaded pin arrangements are shown in FIGS. 20A-D. As would be appreciated by a person of ordinary skill in the art, each of the spring loaded pin arrangements include a housing for the pin, a pin, and one or more springs.

In one embodiment, the spring loaded pin arrangement/contact assembly 204 is configured to be insert molded into the clutch collar 27. This provides for easy assembly for production, and eliminates blind assembly.

Figure 21A:
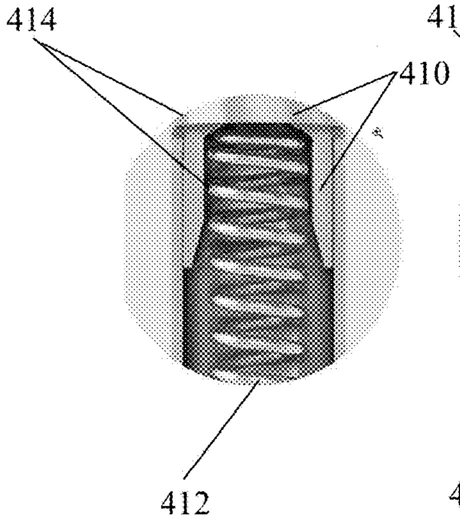
FIGS. 21A-C show different exemplary internal designs for the contact assembly/spring loaded contact pin arrangement according to embodiments of the present patent application.
Figure 21B:
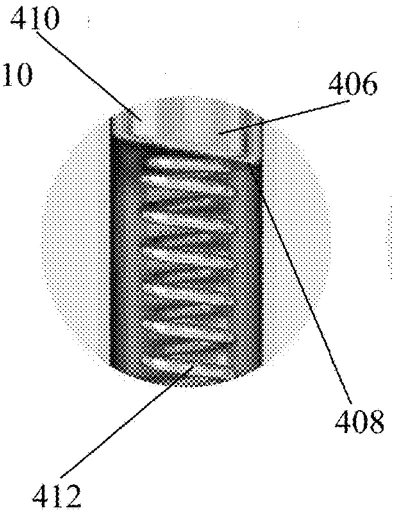
Figure 21C:
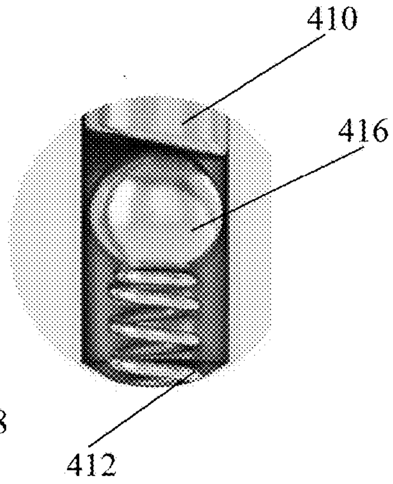

In one embodiment, FIGS. 21A-C shows various internal designs of the spring loaded pins in the spring loaded pin arrangements/contact assembly 204 including back drill design/configuration (as shown in FIG. 21A), bias tail design/configuration (as shown in FIG. 21B), ball design/configuration (as shown in FIG. 21C), and/or other designs/configurations that are appreciated by a person of ordinary skill in the art. In the bias tail design/configuration, the bias 406 of the tail 408 of the pin 410 (at the contacting areas between the pin 410 and the spring 412) creates a lateral force and better/improved contact. In the back drill design/configuration, the drilled tail 414 of the pin 410 creates extra space for the spring 412 and creates a shorter spring loaded pin. In the ball design/configuration, a ball 416 is configured to stabilize the contacting areas between the pin 410 and the spring 412 for better/improved performance.

Figure 22:
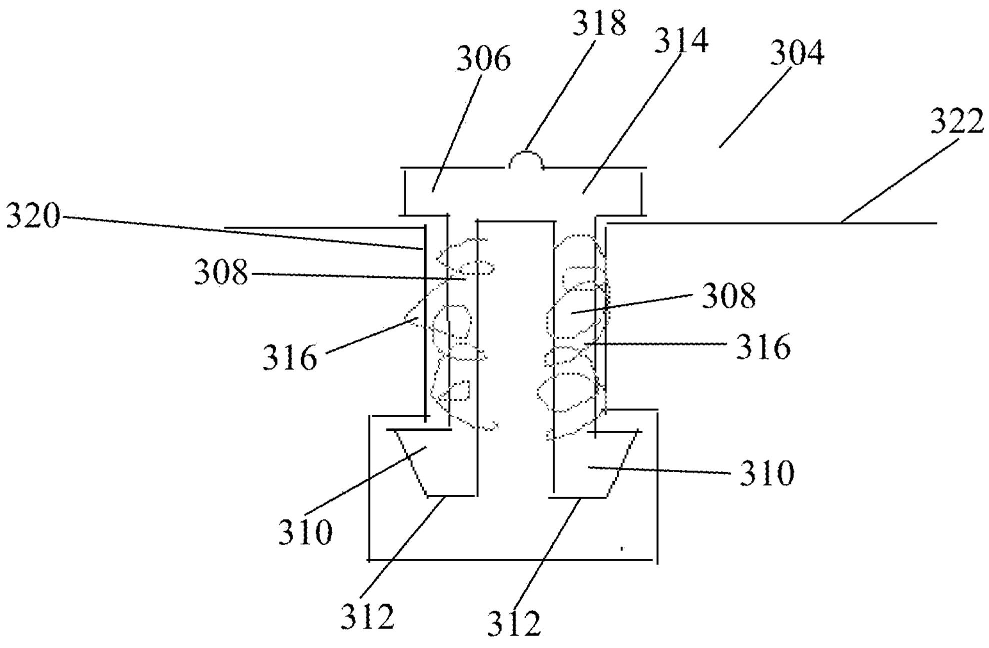
FIG. 22 shows an exemplary contact assembly of the clutch setting assembly according to another embodiment of the present patent application.
Figure 23:
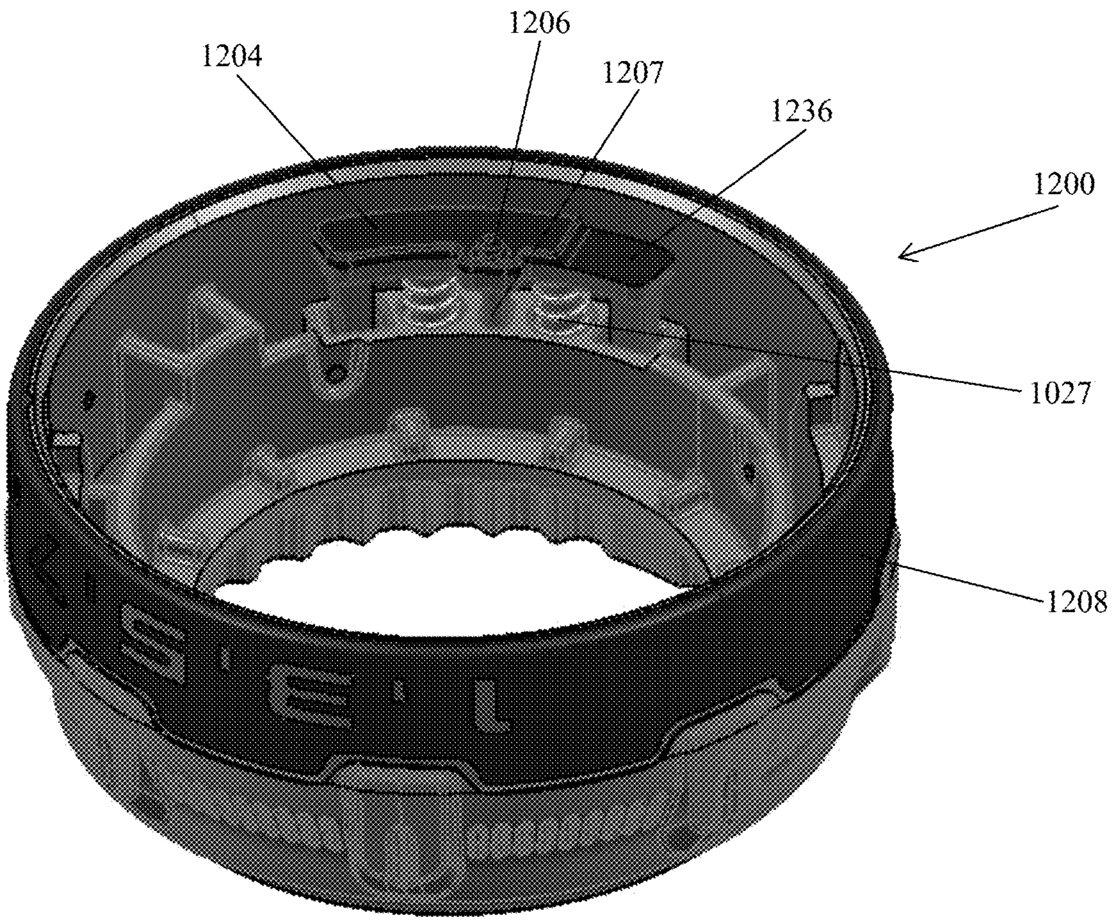
FIG. 23 shows the clutch setting assembly including the clutch selector and the contact assembly according to another embodiment of the present patent application, where some portions of the clutch setting assembly are not shown to better illustrate other portions of the clutch setting assembly.
Figure 24:
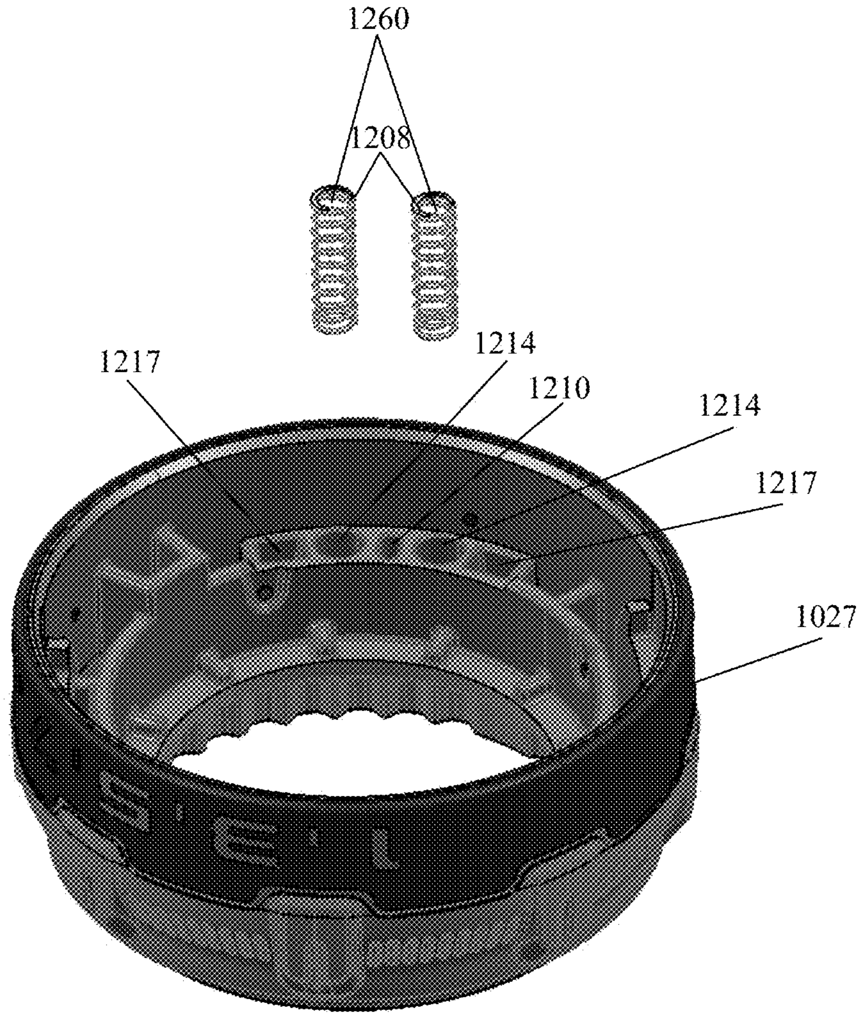
FIG. 24 shows the clutch setting assembly including the clutch selector and springs of the contact assembly according to another embodiment of the present patent application, where some portions of the clutch setting assembly are not shown to better illustrate other portions of the clutch setting assembly.
Figure 25:
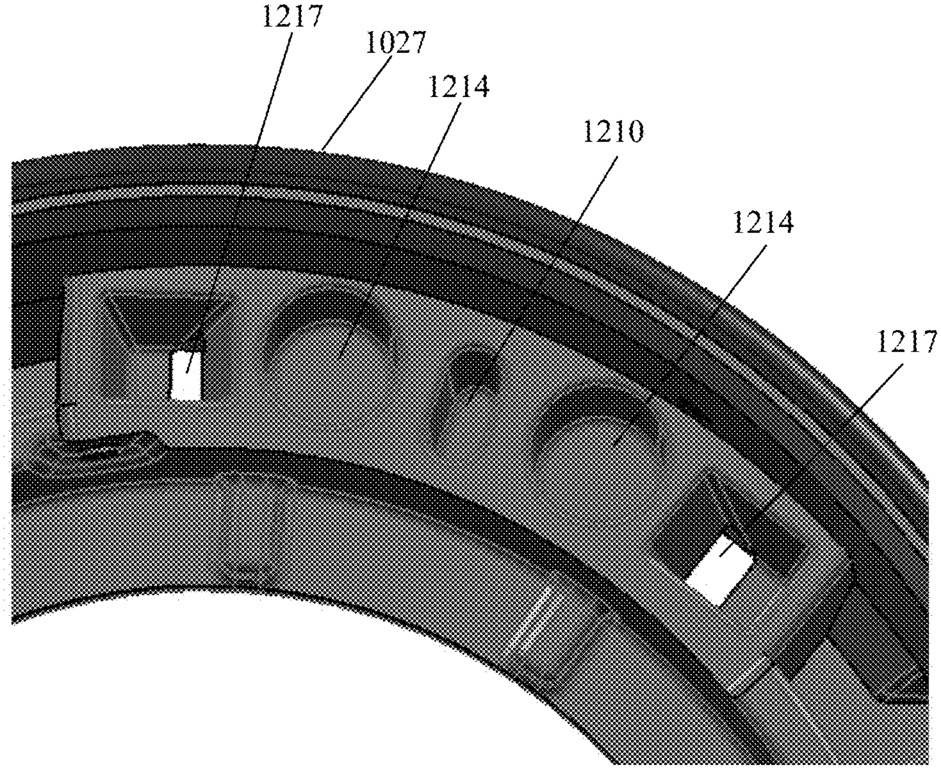
FIGS. 25 and 26 show partial views of the clutch selector according to another embodiment of the present patent application, where
Figure 26:
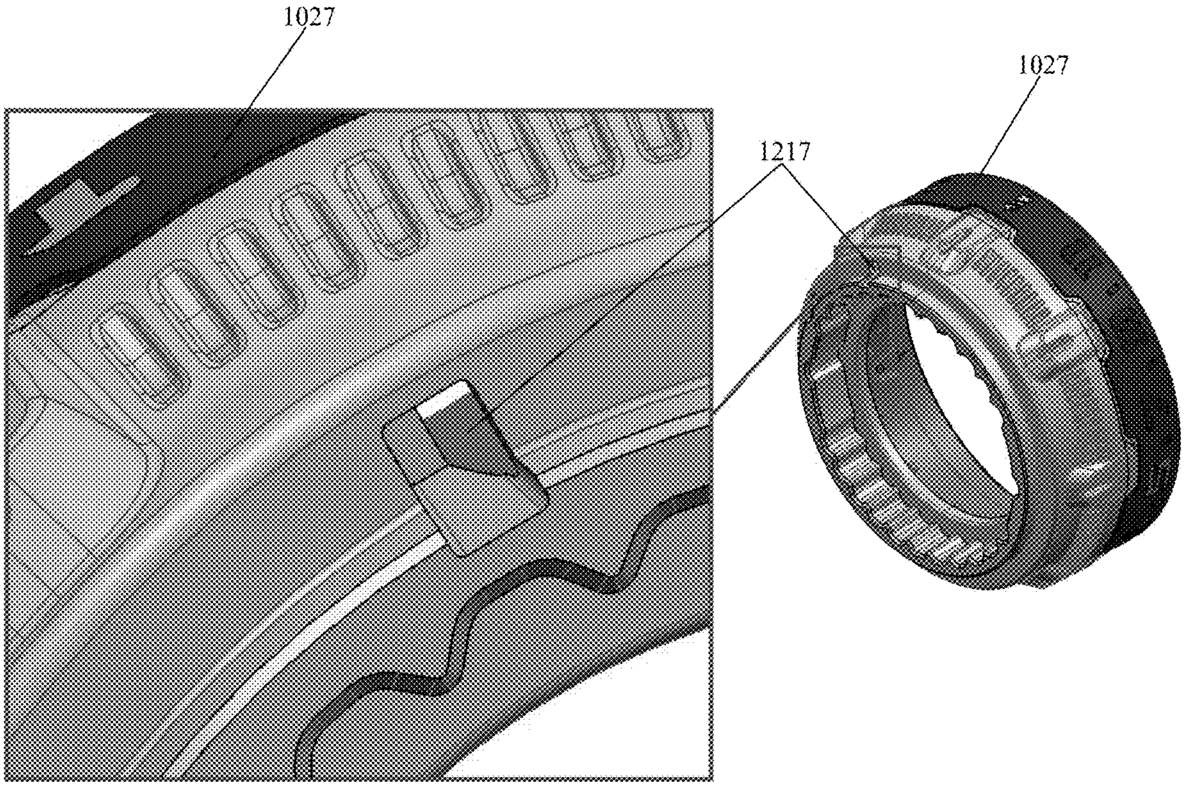

FIG. 22 discloses another embodiment of the contact assembly 304. The contact assembly 304 generally includes a contact pin 306 and springs 316. The contact pin 306 includes an upside-down U-shaped configuration. The contact pin 306 include a cross-bar/head portion 314 and two legs 308 protruding downwardly from the cross-bar/head portion 314. The head portion 314 may be interchangeably referred to as head 314. Each leg 308 of the contact pin 306 has an outwardly protruding tangs/portions 310 on their end portions 312. The head portion 314 has a projection 318 disposed thereon and extending upwardly away from the surface of the head portion 314. The projection 318 is configured to engage with portions of the resistor PCB/variable resistive element (not shown in this figure but described in detail throughout the present patent application) to generate the resistance signal that corresponds to the position of the clutch selector. The legs 308 are configured to be squeezed together to insert the contact pin 306 into a bore/an opening 320 of a clutch selector/collar 322. One or more compression springs 316 are configured to bias the contact pin 306 outwardly away from the bore/opening 320 of the clutch selector/collar 322.

Figure 32:
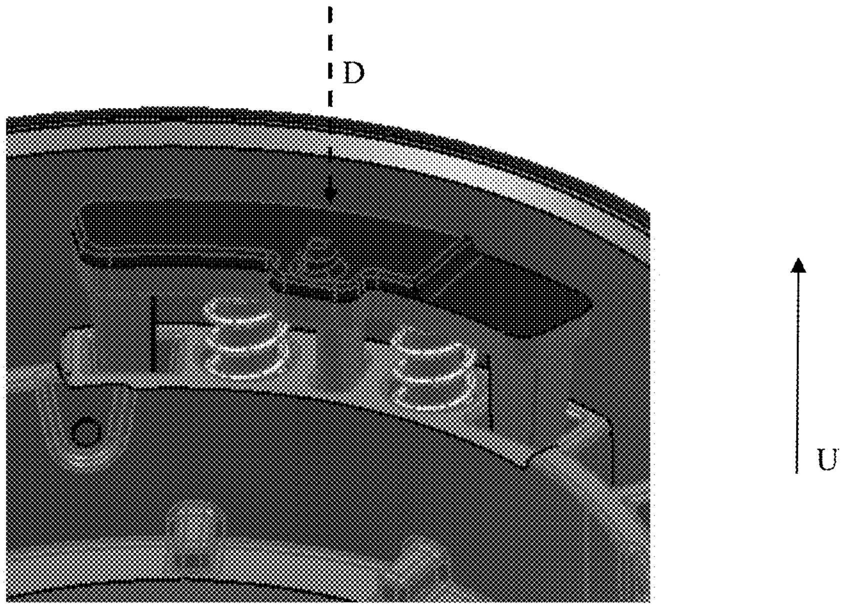
Figure 33:
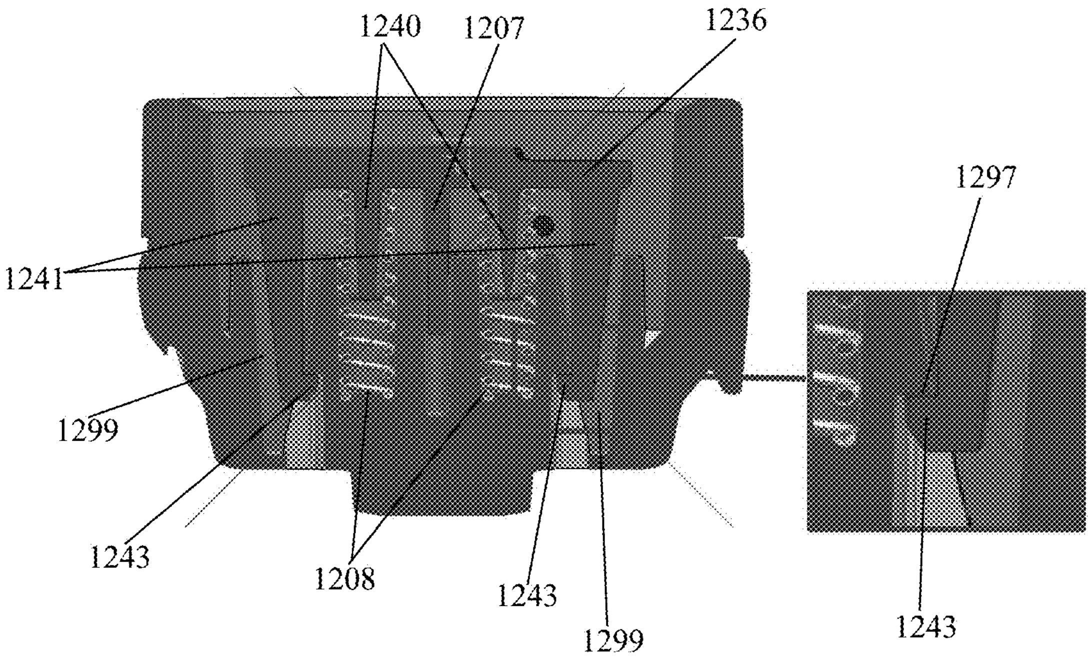
FIG. 33 shows cross-sectional views the contact assembly including the spring keeper of the contact assembly in its released and retained position in the clutch selector according to another embodiment of the present patent application.
Figure 34:
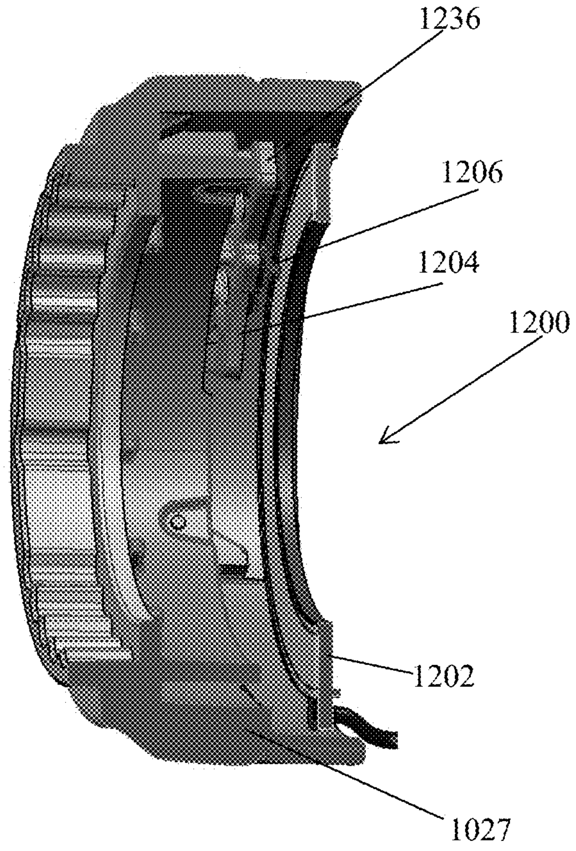
FIG. 34 shows the contact assembly engaging with the variable resistive element of the clutch setting assembly according to another embodiment of the present patent application.

FIGS. 23-34 show another embodiment of the clutch setting assembly 1200. The clutch setting assembly 1200 may include the variable resistive element 1202 (as shown in FIG. 34) with a variable resistance (fixedly) coupled to the housing 12, the clutch selector 1027 movable relative to the housing 12 to select a clutch setting, and the contact assembly 1204. The contact assembly 1204 of the clutch setting assembly 1200 includes a contact member 1206 and a spring 1208 that are non-removably coupled to the clutch selector 1027 with the spring 1208 biasing the contact member 1206 against the variable resistive element 1202. The configuration and the operation of the variable resistive element 1202, the contact assembly 1204, and the clutch selector 1027 are similar to that of the variable resistive element 202, the contact assembly 204, and the clutch selector 27 except for the differences described in detail below.

The contact assembly 1204 includes the contact member 1206 and the spring 1208 that are non-removably coupled to the clutch selector 1027 such that the contact assembly 1204 rotates along with the clutch selector 1027. In the illustrated embodiment of FIGS. 27-34, the design of the contact assembly 1204 eliminates a separate contact pin (206 in the discussions above) and combines/integrates the contact pin/member head geometry 1206 into the spring keeper 1236 itself. Thus, this embodiment of FIGS. 27-34 eliminates a separate part and making the assembly procedures even easier. Also, the spring keeper 1236 includes a snap tab design that snaps into corresponding features into the clutch collar 1027 to retain the contact assembly 1204 in the clutch collar 1027 as will be described in detail below.

In one embodiment, as shown in FIGS. 24-27, the clutch collar 1027 has an alignment member receiving portion 1210 that receives an alignment member 1207 and that is flanked by a pair of spring receiving portions/spring pockets 1214 that receive the springs 1208. The clutch collar 1027 also includes a pair of spring keeper retainer receiving portions 1217 that receive the spring keeper retainers 1241 therein. The pair of spring receiving portions/spring pockets 1214 is flanked by the pair of spring keeper retainer receiving portions 1217. The alignment member receiving portion 1210 may have elliptical, oblong or other shaped configurations. The spring receiving portions/spring pockets 1214 may have circular or other shaped configurations. The spring keeper retainer receiving portions 1217 may have rectangular, square or other shaped configurations.

The contact assembly 1204 may include the spring keeper 1236 and the pair of compression springs 1208 all received in and retained by the clutch selector 1027. The contact assembly 1204 may include the pair of springs 1208 that is received in and is non-removably coupled to the clutch collar 1027. The springs 1208 are compression springs. The pair of compression springs 1208 is received in the spring pockets 1214 of the clutch collar 1027 and is configured to receive a pair of lateral legs 1240 of the spring keeper 1236 therein. The diameter of each of the pair of compression springs 1208 is sized to fit into the corresponding spring pockets 1214 of the clutch collar 1027 and also sized to receive the corresponding one of the pair of lateral legs 1240 of the spring keeper 1236 in the assembled configuration of the contact assembly 1204. The pair of compression springs 1208 is positioned symmetrically on both sides of the alignment member 1207. The configuration of the compression spring 1208 is similar to that of the corresponding compression spring 208.

Figure 27:
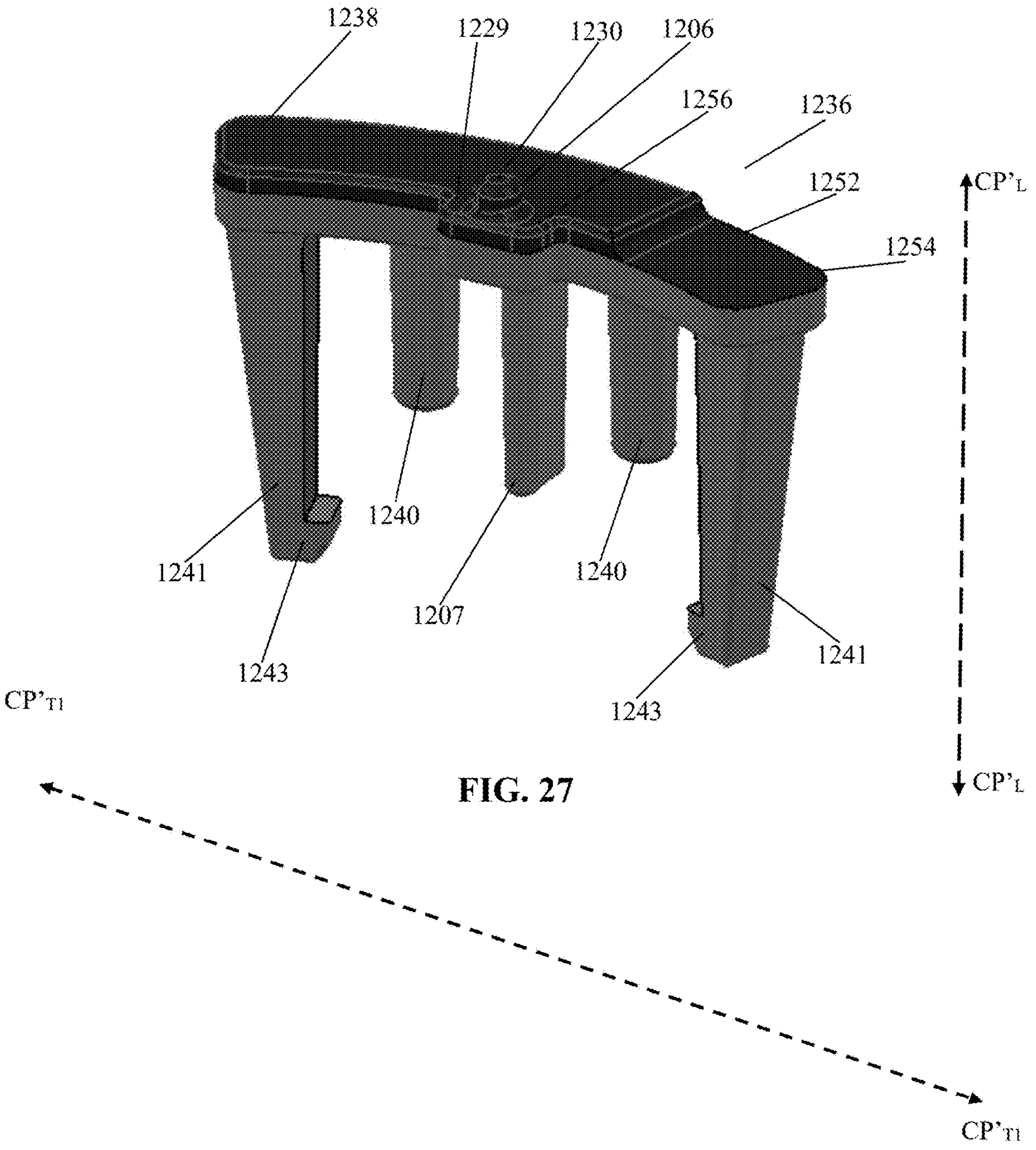
FIG. 27 shows the spring keeper of the contact assembly of the clutch setting assembly according to another embodiment of the present patent application.
Figure 28:
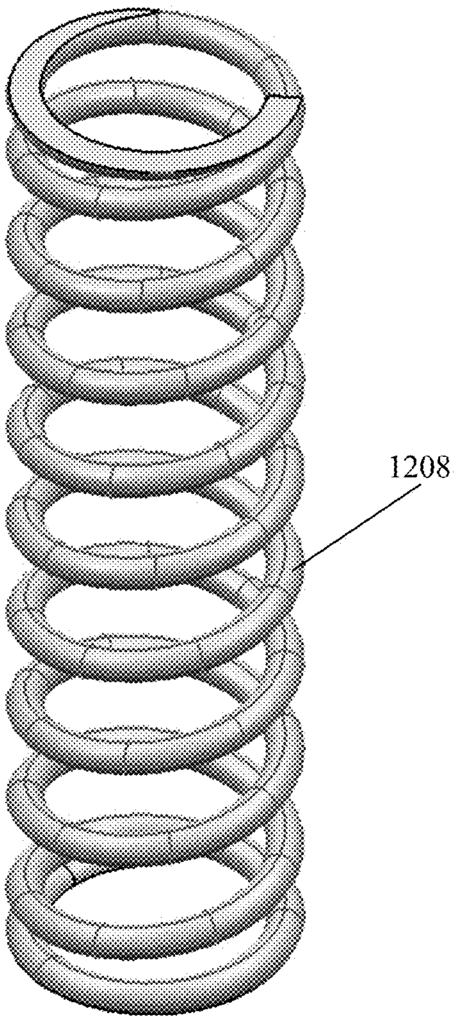
FIG. 28 shows the exemplary spring of the contact assembly of the clutch setting assembly according to another embodiment of the present patent application.

Referring to FIG. 27, the spring keeper 1236 has the top plate/member 1238, the alignment member 1207, the pair of lateral legs 1240 and the pair of spring keeper retainers 1241. The alignment member 1207, the pair of lateral legs 1240 and the pair of spring keeper retainers 1241 extend downward and away from the top plate/member 1238.

The alignment member 1207 is configured to be received in the alignment member receiving portion 1210. The alignment member 1207 may be interchangeably referred to as alignment stanchion. The alignment member 1207 and the alignment member receiving portion 1210 have corresponding shaped configurations. The alignment member 1207 is configured to act as an alignment feature for the contact assembly 1204 when the contact assembly 1204 is assembled and is non-removably coupled to the clutch collar 1027.

Each of the pair of lateral legs 1240 have cylindrical shaped configuration. Each of the pair of lateral legs 1240 may be interchangeably referred to as spring stanchion. The diameter of each of the pair of lateral legs 1240 is sized to fit into the corresponding springs 1208 in the assembled configuration of the contact assembly 1204. When the contact assembly 1204 is assembled and is non-removably coupled to the clutch collar 1027, the pair of lateral legs 1240 are aligned and received in the compression springs 1208.

First end portions of the pair of spring keeper retainers 1241 are connected to the top plate/member 1238. Opposing, second end portions of the pair of spring keeper retainers 1241 include catches 1243. The catch 1243 may be interchangeably referred to as snap tab, lock portion/member, or retainer. The catch 1243 may be configured to extend/protrude, along the first transverse axis $CP'_{T1}$-$CP'_{T1}$, outwardly and away from the external surface of the each of the pair of spring keeper retainers 1241. As will be clear from the detailed discussions below, the catches 1243 are configured to engage with portions of the clutch selector 1027 so as to non-removably couple the contact assembly 1204 to the clutch selector 1027.

Each of the pair of spring keeper retainers 1241 may have a flexible configuration. Each of the pair of spring keeper retainers 1241 may have varying cross-sectional configuration (e.g., tapered cross-sectional configuration from their respective first end portion to their respective second end portion). This flexible and varying cross-sectional configuration of each of the pair of spring keeper retainers 1241 enable interengagement between the catches 1243 and their corresponding spring keeper retainer receiving portions 1217 in the clutch selector 1027 so as to non-removably couple the contact assembly 1204 to the clutch selector 1027.

In one embodiment, the catches/snap tabs 1243 are configured to be inserted into the snap tab pockets/openings/spring keeper retainer receiving portions 1217 so as to non-removably couple the contact assembly 1204 to the clutch selector 1027. The snap tabs 1243 and the snap tab pockets/openings 1217 have corresponding structures/configurations (e.g., (inclined) cam surfaces) to enable interengagement between the catches 1243 and the snap tab pockets/openings 1217 so as to non-removably couple the contact assembly 1204 to the clutch selector 1027. For example, referring to FIG. 33, when the snap tabs 1243 are inserted into the snap tab pockets/openings 1217, the snap tabs 1243 may move along the inclined cam surfaces 1299 on the snap tab pockets/openings 1217 and then snapped into position in the snap tab pockets/openings 1217, with lock surfaces 1297 holding the snap tabs 1243 in the retained/lock position.

In another embodiment, the interengagement between the catches 1243 and the spring keeper retainer receiving portions 1217 may be provided by other lock configurations, for example, detent lock, ball bearing lock, spring loaded lock, etc. that are configured to non-removably couple the contact assembly 1204 to the clutch selector 1027.

In illustrated embodiment, as shown in FIG. 27, the contact member 1206 includes an asymmetrical plate portion 1229 and includes the contact point or projection 1230 disposed thereon. The contact point 1230 is configured to engage with portions of the variable resistive element 1202 when the springs 1208 of the contact assembly 1204 bias the contact member 1206 against variable resistive element 1202. The contact point 1230 may be interchangeably referred to potentiometer contact point. The contact point 1230 is configured to extend/protrude, along the longitudinal axis CP'L-CP'L, outwardly and away from the surface 1256 of the spring keeper 1236.

In one embodiment, the spring keeper 1236 and its components may be made of a material that is configured to withstand the vibrations and/or other forces in the power tool 10. In one embodiment, the spring keeper 1236 and its components is made of impact resistance material or impact absorbing material.

In one embodiment, the spring keeper 1236 includes the cutout portion 1252 at one end portion 1254 of the top plate/member 1238 to remove excess material of the spring keeper 1236. In another embodiment, the cutout portion 1252 is optional.

FIGS. 29-32 show various procedures in a method of assembling the contact assembly 1204 of the clutch setting assembly 1200 and non-removably coupling the contact assembly 1204 of the clutch setting assembly 1200 to the clutch selector 1027 according to another embodiment of the present patent application.

Figure 29:
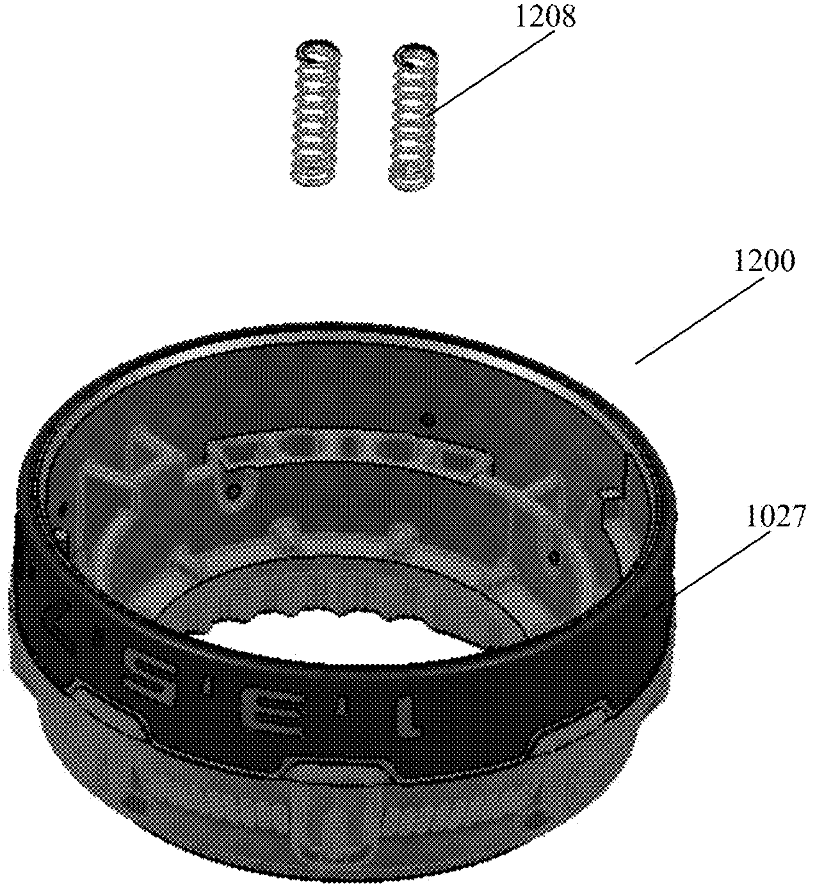
FIGS. 29-32 show various procedures in a method of assembling the contact assembly of the clutch setting assembly and non-removably coupling the contact assembly of the clutch setting assembly to the clutch selector according to another embodiment of the present patent application, where
Figure 30:
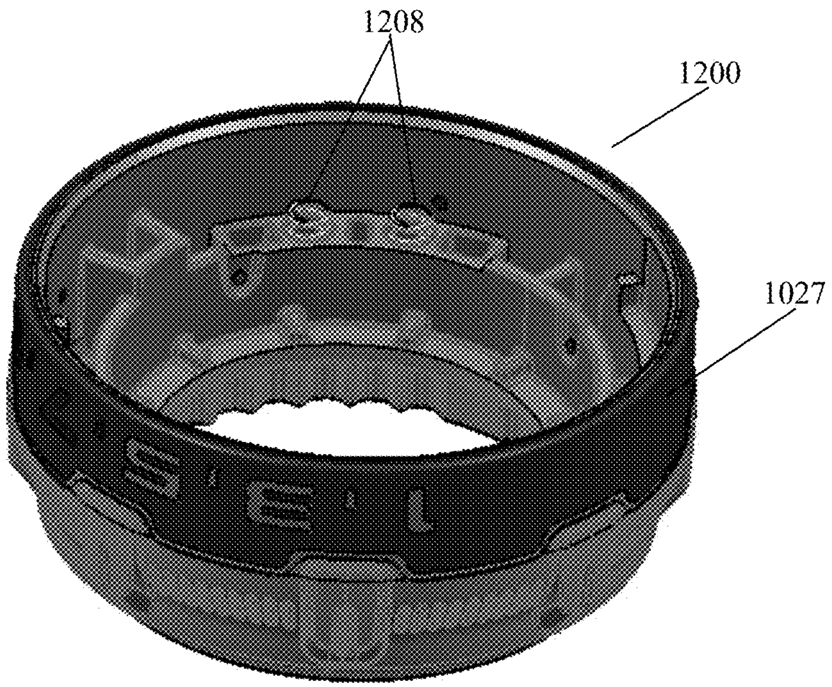

FIGS. 29 and 30 show the clutch selector 1027 before and after the springs 1208 being inserted/received therein, respectively. In one embodiment, the springs 1208 of the contact assembly 1204 are inserted into the spring pockets 1214 in the clutch selector/collar 1027.

Figure 31:
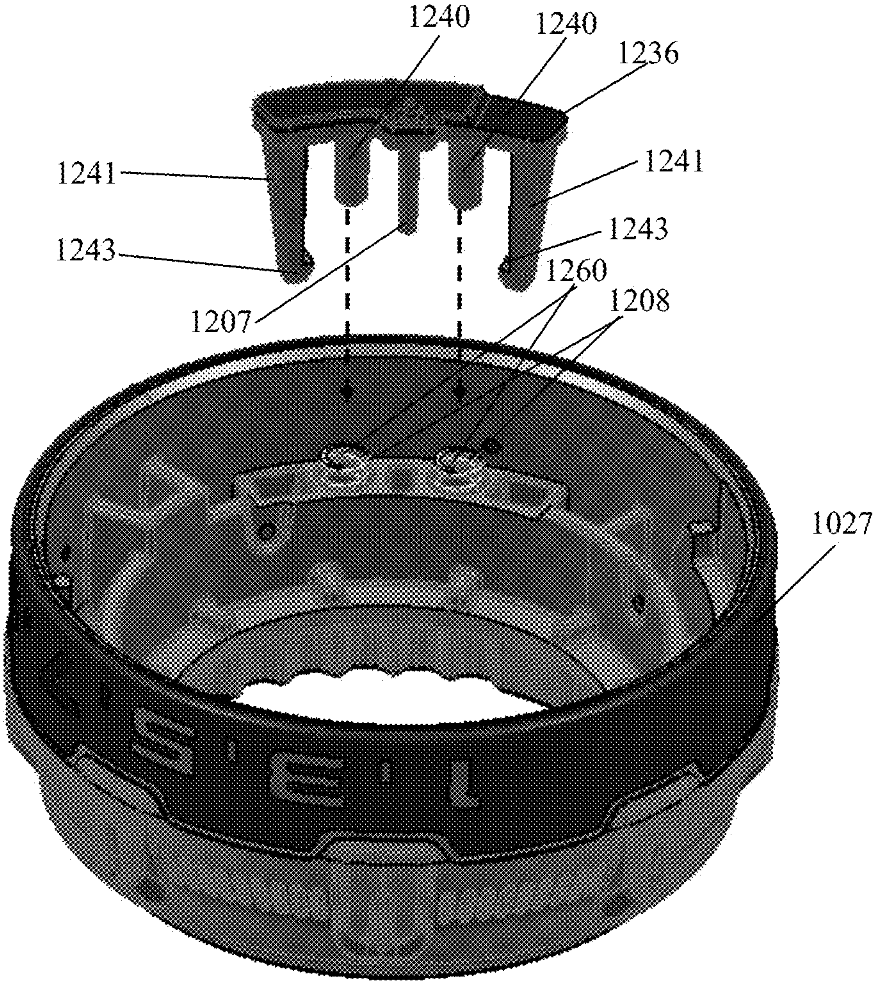

FIGS. 31 and 32 show the clutch selector 1027 before and after the spring keeper 1236 being inserted therein, respectively. In one embodiment, the legs 1240 of the spring keeper 1236 are inserted into the openings 1260 of the springs 1208, which are inserted in the spring pockets 1214 in the clutch selector/collar 1027. In one embodiment, the alignment member 1207 of the spring keeper 1236 is inserted into the alignment member receiving portion 1210 in the clutch selector 1027. In one embodiment, the pair of spring keeper retainers 1241 are inserted into the spring keeper retainer receiving portions 1217 so as to non-removably couple the contact assembly 1204 to the clutch selector 1027. That is, the snap tabs 1243 of the spring keeper 1236 are inserted into the snap tab pockets 1217 of the clutch selector 1027 and the spring stanchions 1240 of the spring keeper 1236 are aligned with the compression springs 1208 in the clutch selector 1027.

After the spring keeper 1236 is inserted into the clutch selector 1027, the spring keeper 1236 pressed downwardly in the direction D toward the clutch selector/collar 1027 and against the force of the springs 1208. The catches 1243 of the spring keeper 1236 align with and inserted into the snap tab pockets 1217 of the clutch collar 1027 when the contact assembly 1204 (including the contact member 1206, the spring keeper 1236, and the springs 1208) is pressed down into the clutch collar 1027.

Once the catches 1243 of the spring keeper 1236 are aligned with and received in the snap tab pockets 1217 of the clutch collar 1027, the contact assembly 1204 (including the contact member 1206, the springs 1208 and the spring keeper 1236) is released (upwardly in the direction U). The catches 1243 of the spring keeper 1236 now abuts against the lock surfaces 1297 of the clutch selector 1027, which retain the contact assembly 1204 (including the contact member 1206, the springs 1208 and the spring keeper 1236) in the clutch selector/collar 1027 (e.g., see FIG. 33). That is, the spring keeper 1236 is pressed down in the direction D until the snap tabs 1243 click (e.g., heard by an audible click) into the corresponding features in the clutch collar 1027 and then the spring keeper 1236 is released. The catches 1243 of the spring keeper 1236 interface with the lock surfaces 1297 of the clutch selector 1027 and keep the contact assembly 1204 (including the contact member 1206, the springs 1208 and the spring keeper 1236) retained in the clutch selector/collar 1027.

FIG. 32 shows the contact assembly 1204 including the contact member 1206 and the spring keeper 1236 in its released and retained position. In one embodiment, the clutch selector/collar 1027 is then assembled to the power drill housing 12, so that the contact point 1230 engages or makes contact with the variable resistive element/membrane potentiometer 1202 in the power drill housing 12 (e.g., see FIG. 34).

FIG. 33 shows cross-sectional views of the assembled spring keeper 1236, the compression springs 1208 and the clutch collar 1027. FIG. 33 also shows a cross-sectional view of the interface between the snap tab feature 1243 and the clutch collar 1027.

FIG. 34 shows the clutch setting assembly 1200 including the contact assembly 1204 (including the contact member 1206, the springs 1208 and the spring keeper 1236), the clutch selector 1027, and the variable resistive element 1202. FIG. 34 shows the contact point 1230 making contact with the potentiometer/variable resistive element 1202 for the electronic clutch. In one embodiment, the springs 1208 bias the contact assembly 1204 toward the variable resistive element/membrane potentiometer 1202 to keep good contact between the contact point 1230 and the variable resistive element/membrane potentiometer 1202. In one embodiment, as the clutch collar 1027 rotates to change the clutch setting, the contact member 1206 moves along with the clutch collar 1027 to engage the contact point 1230 at a different location of the variable resistive element/membrane potentiometer 1202. This engagement changes the resistance of the variable resistive element/membrane potentiometer 1202, allowing the controller for the electronic clutch to sense the position of the clutch collar 1027.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A power tool comprising:

a housing;

an output spindle;

an electric motor disposed in the housing and configured to provide torque to the output spindle;

an input switch for actuating the electric motor;

an electronic clutch including a sensor configured to sense a power tool operation parameter and a controller coupled to the sensor and configured to initiate a first protective operation to interrupt or reduce transmission of torque from the electric motor to the output spindle when the sensed power tool operation parameter indicates that an output torque has exceeded a torque threshold value; and a clutch setting assembly including a variable resistive element with a variable resistance coupled to the housing, a clutch selector movable relative to the housing to select a clutch setting, and a contact assembly coupled to the clutch selector, the contact assembly including a spring coupled to the clutch selector and a contact member configured to be insertable into an opening in the clutch selector so that the spring and the contact member are non-removable from the clutch selector and the spring biases the contact member against the variable resistive element, wherein the contact member has a head configured to engage the variable resistive element to generate a resistance signal that corresponds to a position of the clutch selector, and wherein the controller is configured to receive the resistance signal and, based on the resistance signal, look-up, receive, or generate the torque threshold value for the power tool operation parameter that corresponds to the selected clutch setting.

2. The power tool of claim 1, wherein the head includes a projection disposed thereon, and wherein the projection is configured to engage the variable resistive element to generate the resistance signal that corresponds to the position of the clutch selector.

3. The power tool of claim 1, wherein the variable resistive element is non-movable relative to the housing.

4. The power tool of claim 1, wherein the clutch selector comprises a collar rotatably coupled to the housing and rotation of the collar changes the selected clutch setting.

5. The power tool of claim 1, wherein the spring is received within an opening in the clutch selector and a leg of a spring keeper is received within the spring.

6. The power tool of claim 1, further comprising a second spring that is received in a second opening in the clutch selector.

7. The power tool of claim 1, wherein the clutch selector includes a spring keeper coupled to the spring and the contact member coupled to the spring keeper, the contact member moveable relative to the spring keeper to non-removably retain the spring, the spring keeper, and contact member relative to the clutch selector.

8. The power tool of claim 7, wherein the spring keeper comprises a leg, and the contact member includes a projection and the head.

9. The power tool of claim 8, wherein the projection of the contact member includes a key and the clutch selector includes a slot, whereby rotation of the contact member causes the key to engage the slot to retain the contact member in the clutch selector.

10. The power tool of claim 1, wherein a projection of the contact member is configured to be snap fit into the opening of the clutch selector.

11. The power tool of claim 10, wherein the projection of the contact member includes a catch configured to engage an undercut in the opening of the clutch selector.

12. The power tool of claim 1, wherein the opening of the clutch selector comprises a plurality of openings and a leg of a spring keeper comprises a plurality of legs received in the plurality of openings.

13. The power tool of claim 1, wherein the sensor includes a rotation sensor that is configured to sense changes in an angular position of an output shaft of the electric motor and to provide a sensing signal corresponding to angular rotation, speed, and/or acceleration of the electric motor to the controller.

14. The power tool of claim 1, wherein the first protective operation includes at least one of interrupting power to the electric motor, reducing power to the electric motor, braking the electric motor, and actuating a mechanical clutch element.

15. The power tool of claim 1, wherein the variable resistive element includes a plurality of conductive elements circumferentially spaced apart on the variable resistive element; and wherein resistance of the variable resistive element changes when pressure is applied by a portion of the contact assembly on one of the plurality of conductive elements disposed along the variable resistive element.

16. The power tool of claim 1, wherein the contact member and the spring are two different structural members.

17. The power tool of claim 1, wherein the contact member is disposed above the spring.

18. A power tool comprising:

a housing;

an output spindle;

an electric motor disposed in the housing and configured to provide torque to the output spindle;

an input switch for actuating the electric motor;

an electronic clutch including a sensor configured to sense a power tool operation parameter and a controller coupled to the sensor and configured to initiate a first protective operation to interrupt or reduce transmission of torque from the electric motor to the output spindle when the sensed power tool operation parameter indicates that an output torque has exceeded a torque threshold value; and a clutch setting assembly including a variable resistive element with a variable resistance coupled to the housing, a clutch selector movable relative to the housing to select a clutch setting, and a contact assembly coupled to the clutch selector, the contact assembly including a spring coupled to the clutch selector and a contact member configured to be snap fit with the clutch selector, so that the contact member is non-reversibly non-removable from the clutch selector and the spring biases the contact member against the variable resistive element, wherein the contact member has a head configured to engage the variable resistive element to generate a resistance signal that corresponds to a position of the clutch selector, and wherein the controller is configured to receive the resistance signal and, based on the resistance signal, look-up, receive, or generate the torque threshold value for the power tool operation parameter that corresponds to the selected clutch setting.

19. The power tool of claim 18, wherein the contact member includes a shaft received in an opening in the clutch selector and a catch coupled to the shaft configured to engage an undercut in the opening.

20. The power tool of claim 18, wherein the head includes a projection disposed thereon, and wherein the projection is configured to engage the variable resistive element to generate the resistance signal that corresponds to the position of the clutch selector.

21. The power tool of claim 18, wherein the variable resistive element is non- movable relative to the housing.

22. The power tool of claim 18, wherein the clutch selector comprises a collar rotatably coupled to the housing and rotation of the collar changes the selected clutch setting.

23. The power tool of claim 18, wherein the spring is received within an opening in the clutch selector and a leg of a spring keeper is received within the spring.

24. The power tool of claim 23, further comprising a second spring that is received in a second opening in the clutch selector.

25. The power tool of claim 18, wherein the sensor includes a rotation sensor that is configured to sense changes in an angular position of an output shaft of the electric motor and to provide a sensing signal corresponding to angular rotation, speed, and/or acceleration of the electric motor to the controller.

26. The power tool of claim 18, wherein the first protective operation includes at least one of interrupting power to the electric motor, reducing power to the electric motor, braking the electric motor, and actuating a mechanical clutch element.

27. The power tool of claim 18, wherein the variable resistive element includes a plurality of conductive elements circumferentially spaced apart on the variable resistive element; and wherein resistance of the variable resistive element changes when pressure is applied by a portion of the contact assembly on one of the plurality of conductive elements disposed along the variable resistive element.

28. A power tool comprising:

a housing;

an output spindle;

an electric motor disposed in the housing and configured to provide torque to the output spindle;

an input switch for actuating the electric motor;

an electronic clutch including a sensor configured to sense a power tool operation parameter and a controller coupled to the sensor and configured to initiate a first protective operation to interrupt or reduce transmission of torque from the electric motor to the output spindle when the sensed power tool operation parameter indicates that an output torque has exceeded a torque threshold value; and a clutch setting assembly including a variable resistive element with a variable resistance coupled to the housing, a clutch selector movable relative to the housing to select a clutch setting, and a contact assembly coupled to the clutch selector, the contact assembly including a spring coupled to the clutch selector and a contact pin configured to be inserted into an opening in the clutch selector and then moved relative to the opening so that the contact pin is non-removable from the clutch selector and the spring biases the contact pin against the variable resistive element, wherein the contact pin has a head configured to engage the variable resistive element to generate a resistance signal that corresponds to a position of the clutch selector, and wherein the controller is configured to receive the resistance signal and, based on the resistance signal, look-up, receive, or generate the torque threshold value for the power tool operation parameter that corresponds to the selected clutch setting.

29. The power tool of claim 28, wherein the head includes a projection disposed thereon, and wherein the projection is configured to engage the variable resistive element to generate the resistance signal that corresponds to the position of the clutch selector.

30. The power tool of claim 28, wherein the variable resistive element is non- movable relative to the housing.

31. The power tool of claim 28, wherein the clutch selector comprises a collar rotatably coupled to the housing and rotation of the collar changes the selected clutch setting.

32. The power tool of claim 28, wherein the spring is received within the opening in the clutch selector and a leg of a spring keeper is received within the spring.

33. The power tool of claim 28, further comprising a second spring that is received in a second opening in the clutch selector.

34. The power tool of claim 28, wherein the clutch selector includes a spring keeper coupled to the spring and the contact pin coupled to the spring keeper, the contact pin moveable relative to the spring keeper to non-removably retain the spring, the spring keeper, and the contact pin relative to the clutch selector.

35. The power tool of claim 34, wherein the spring keeper comprises a leg, and the contact pin includes a projection and the head.

36. The power tool of claim 35, wherein the projection of the contact pin includes a key and the clutch selector includes a slot, whereby rotation of the contact pin causes the key to engage the slot to retain the contact pin in the clutch selector.

37. The power tool of claim 28, wherein the opening of the clutch selector comprises a plurality of openings and a leg of a spring keeper comprises a plurality of legs received in the plurality of openings.

38. The power tool of claim 28, wherein the sensor includes a rotation sensor that is configured to sense changes in an angular position of an output shaft of the electric motor and to provide a sensing signal corresponding to angular rotation, speed, and/or acceleration of the electric motor to the controller.

39. The power tool of claim 28, wherein the first protective operation includes at least one of interrupting power to the electric motor, reducing power to the electric motor, braking the electric motor, and actuating a mechanical clutch element.

40. The power tool of claim 28, wherein the variable resistive element includes a plurality of conductive elements circumferentially spaced apart on the variable resistive element;

and wherein resistance of the variable resistive element changes when pressure is applied by a portion of the contact assembly on one of the plurality of conductive elements disposed along the variable resistive element.

* * * * *